(12) United States Patent
Hasegawa et al.

(10) Patent No.: US 7,918,208 B2
(45) Date of Patent: Apr. 5, 2011

(54) FUEL SUPPLY APPARATUS

(75) Inventors: Jun Hasegawa, Kariya (JP); Masahiro Yokoi, Kariya (JP); Yoshihito Suzuki, Kariya (JP); Kaoru Oda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/477,641

(22) Filed: Jun. 3, 2009

(65) Prior Publication Data

US 2009/0301441 A1  Dec. 10, 2009

(30) Foreign Application Priority Data

Jun. 4, 2008  (JP) ................................ 2008-146469
Jun. 4, 2008  (JP) ................................ 2008-146512

(51) Int. Cl.
*F02M 37/04* (2006.01)
(52) U.S. Cl. .................. 123/446; 251/129.18; 361/152; 701/104
(58) Field of Classification Search .................. 123/446, 123/506; 215/129.15, 129.18; 361/152, 361/160, 179; 701/103, 104, 106
See application file for complete search history.

(56) References Cited

U.S. PATENT DOCUMENTS

| | | | | |
|---|---|---|---|---|
| 5,377,068 A | * | 12/1994 | Kaylor et al. | 361/154 |
| 5,650,909 A | * | 7/1997 | Remele et al. | 361/154 |
| 5,691,680 A | * | 11/1997 | Schrey et al. | 335/256 |
| 5,825,216 A | * | 10/1998 | Archer et al. | 327/110 |
| 5,917,692 A | * | 6/1999 | Schmitz et al. | 361/187 |
| 5,941,216 A | * | 8/1999 | Arakawa | 123/490 |
| 5,947,090 A | * | 9/1999 | Maeda | 123/490 |
| 5,959,825 A | * | 9/1999 | Harcombe | 361/154 |
| 5,986,871 A | * | 11/1999 | Forck et al. | 361/160 |
| 6,123,092 A | * | 9/2000 | Torii | 137/1 |
| 6,167,869 B1 | * | 1/2001 | Martin et al. | 123/458 |
| 6,394,414 B1 | * | 5/2002 | Breitling et al. | 251/129.04 |
| 6,966,325 B2 | * | 11/2005 | Erickson | 137/1 |
| 7,284,370 B2 | * | 10/2007 | Tatsukawa | 60/324 |
| 7,441,550 B2 | * | 10/2008 | Ludwig et al. | 123/520 |

FOREIGN PATENT DOCUMENTS

| | | |
|---|---|---|
| JP | 58-214081 | 12/1983 |
| JP | 8-232740 | 9/1996 |
| JP | 9-151768 | 6/1997 |
| JP | 2001-182593 | 7/2001 |

OTHER PUBLICATIONS

Japanese Office Action dated Dec. 2, 2010, issued in corresponding Japanese Application No. 2008-146469, with English translation.

* cited by examiner

*Primary Examiner* — Thomas N Moulis
(74) *Attorney, Agent, or Firm* — Nixon & Vanderhye PC

(57) ABSTRACT

A movable portion is movable from a closed position, in which the movable portion is in contact with a valve element, to an opened position so as to supply fuel from a fuel portion to a compression chamber through a fuel passage. A drive control unit supplies of a small driving current, which is sufficient to maintain the movable portion at the closed position, to a coil portion so as to move the movable portion from the opened position to the closed position. The drive control unit switches the supply of the small driving current to supply of the large driving current in the course of the movement of the movable portion to the closed position by supplying the small driving current.

20 Claims, 23 Drawing Sheets ized in the compression chamber is, is metered by controlling a time point at which an inlet valve closes. Specifically, as the plunger moves upward from a bottom dead center in a condition where the inlet valve is in an opened state, fuel is returned from the compression chamber through the inlet valve to an inlet side. That is, the fuel in the compression chamber is pressurized only in a condition where the inlet valve is in a closed state. A needle, which is welded to a moving core, makes contact with the inlet valve from the opposite side of the compression chamber. The moving core and the needle are integrally movable as a movable portion. When the coil is de-energized, the coil does not cause magnetic attractive force. In the present condition, the movable portion is moved toward the inlet valve by being applied with biasing force from a spring, and thereby the inlet valve is in the opened state. Alternatively, when the coil is energized, the movable portion is moved away from the inlet valve to a closed position, and thereby the inlet valve is manipulated from the opened state to the closed state. The movable portion, which is in the closed position, is applied with pressure of fuel in the compression chamber at the downstream of the inlet valve and biasing force of the spring at the side of the inlet valve. Thereby, the inlet valve is maintained at the closed state (for example, refer to JP-A-9-151768). However, according to the structure of JP-A-9-151768, operation noise may occur when the movable portion moved to the closed position collides against another component. The operation noise may be occasionally so large and sensed by an occupant.

SUMMARY OF THE INVENTION

In view of the foregoing and other problems, it is an object of the present invention to produce a fuel supply apparatus configured to reduce operation noise, which is caused when a movable portion moves from an opened position to a closed position.

According to one aspect of the present invention, a fuel supply apparatus for a vehicle, the fuel supply apparatus comprises a fuel portion for receiving fuel. The fuel supply apparatus further comprises a valve element located in a fuel passage, which communicates with the fuel portion. The fuel supply apparatus further comprises a delivery portion for supplying fuel pressurized in a compression chamber, which is located downstream of the fuel passage. The fuel supply apparatus further comprises a movable portion movable between a closed position and an opened position and configured to make contact with the valve element. The fuel supply apparatus further comprises a coil portion for applying magnetic attractive force to the movable portion. The fuel supply apparatus further comprises a drive circuit portion configured to manipulate the movable portion from the opened position to the closed position by supplying a first driving current to the coil portion, the drive circuit portion being configured to maintain the movable portion at the closed position by supplying a second driving current, which is less than the first driving current, to the coil portion. The fuel supply apparatus further comprises drive control means for controlling the drive circuit portion by switching supply of the second driving current to supply of the first driving current to move the movable portion to the closed position in the course of movement of the movable portion to the closed position by supplying the second driving current.

According to one aspect of the present invention, a fuel supply apparatus for a vehicle, the fuel supply apparatus comprises a fuel portion for receiving fuel. The fuel supply apparatus further comprises a valve element located in a fuel passage, which communicates with the fuel portion. The fuel supply apparatus further comprises a delivery portion for supplying fuel pressurized in a compression chamber, which is located downstream of the fuel passage. The fuel supply apparatus further comprises a movable portion movable between a closed position and an opened position and configured to make contact with the valve element. The fuel supply apparatus further comprises a coil portion for applying magnetic attractive force to the movable portion. The fuel supply apparatus further comprises a drive circuit portion configured to supply an electric current to the coil portion at a drive voltage. The fuel supply apparatus further comprises drive control means for controlling a start point at which the drive circuit portion supplies the electric current. The fuel supply apparatus further comprises voltage control means for setting a pre-close drive voltage at a position close to the closed position when the movable portion is moved to the closed position, based on the start point and controlling the drive voltage at the pre-close drive voltage.

According to one aspect of the present invention, a method for controlling a fuel supply apparatus for a vehicle, the method comprises supplying a small driving current to a coil portion so as to apply magnetic force to attract a movable portion and thereby to manipulate a valve element from an opened position, in which the movable portion is in contact with the valve element to supply fuel into a compression chamber, to a closed position, in which the valve element is seated to a seat body, the small driving current being sufficient to maintain the movable portion at the closed position. The method further comprises switching supply of the small driving current to supply of a large driving current, which is larger than the small driving current in the course of movement of the movable portion to the closed position by the supplying of the small driving current.

According to one aspect of the present invention, a method for controlling a fuel supply apparatus for a vehicle, the method comprises supplying an electric current to a coil portion so as to apply magnetic force to attract a movable portion and thereby to manipulate a valve element from an opened position, in which the movable portion is in contact with the valve element to supply fuel into a compression chamber, to a closed position, in which the valve element is seated to a seat body, at a drive voltage. The method further comprises controlling a start point of the supplying of the electric current. The method further comprises setting a pre-close drive voltage at a position close to the closed position when the movable portion is moved to the closed position, based on the start point. The method further comprises controlling the drive voltage at a pre-close drive voltage.

BRIEF DESCRIPTION OF THE DRAWINGS

The above and other objects, features and advantages of the present invention will become more apparent from the following detailed description made with reference to the accompanying drawings. In the drawings.

The above and other objects, features and advantages of the present invention will become more apparent from the following detailed description made with reference to the accompanying drawings. In the drawings.

DETAILED DESCRIPTION OF PREFERRED EMBODIMENTS

As follows, embodiments of the present invention will be described with reference to drawings.

First Embodiment

Figure 1:
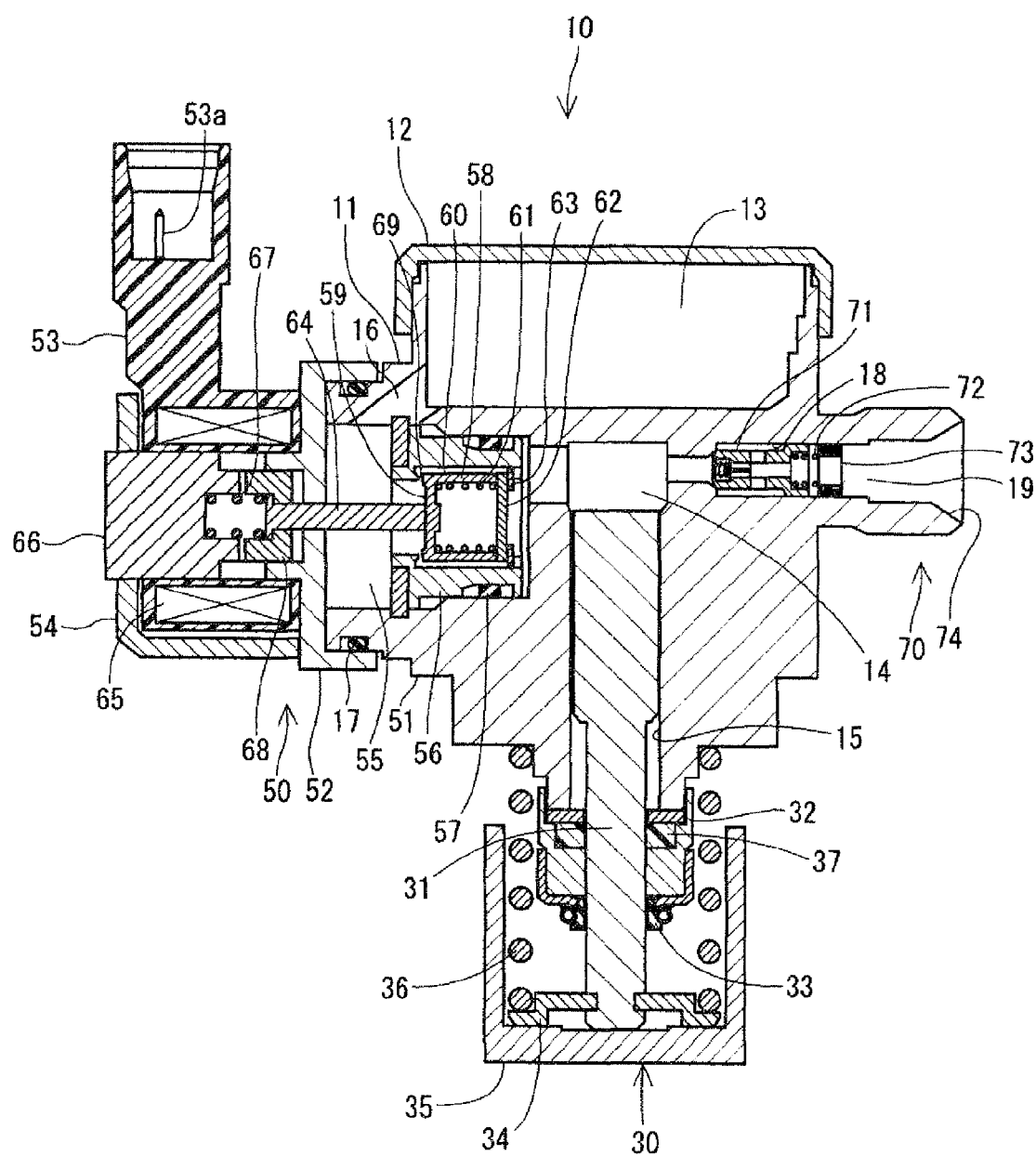
FIG. 1 is a sectional view showing a high-pressure pump of a fuel supply apparatus according to a first embodiment.

FIG. 1 depicts a high-pressure pump 10 according to the first embodiment. The high-pressure fuel pump 10 functions as a supply pump for supplying fuel to an injector of an internal combustion engine such as a diesel engine or a gasoline engine.

The high-pressure pump 10 includes a housing body 11 as a main component. The housing body 11 is formed from, for example, stainless steel such as martensitic stainless steel. The upper portion of the housing body 11 in FIG. 1 is mounted with a cover 12. A plunger portion 30 is provided in the housing body 11 at the opposite side of the cover 12. A metering valve portion 50 and a delivery valve portion 70 are arranged perpendicularly to a direction in which the cover 12 and the plunger portion 30 are arranged. The cover 12 is mounted to the housing body 11, thereby therebetween defining a fuel chamber 13. The fuel chamber 13 is supplied with fuel by using a fuel pump from a fuel tank (none shown). Fuel supplied to the fuel chamber 13 flows through the metering valve portion 50 and a compression chamber 14, and the fuel is pressure fed through the delivery valve portion 70 to a fuel rail (not shown), which is connected with an injector. The compression chamber 14 is located in the vicinity of the center of the housing body 11.

Next, the plunger portion 30, the metering valve portion 50, and the delivery valve portion 70 will be described in order. First, the plunger portion 30 will be described. The plunger portion 30 includes a plunger 31, a plunger supporting member 32, an oil seal 33, a lower seat 34, a lifter 35, and a plunger spring 36. The housing body 11 therein has a cylinder 15. The plunger 31 is supported in the cylinder 15 and movable in the axial direction relative to the cylinder 15. The plunger supporting member 32 is located at an end of the cylinder 15 of the housing body 11. The plunger 31 is supported by the plunger supporting member 32 and the cylinder 15 and movable in the axial direction. The outer diameter of the plunger 31 is substantially the same as the inner diameter of the cylinder 15 at the side of the compression chamber 14. The outer diameter of the plunger 31 is reduced at the side of the plunger supporting member 32. The plunger supporting member 32 therein has a fuel seal 37. The fuel seal 37 restricts fuel from leaking from the compression chamber 14 to the engine. The plunger supporting member 32 has the oil seal 33 at one tip end. The oil seal 33 restricts permeation of oil from the engine into the compression chamber 14. The lower seat 34 is provided to an end of the plunger 31 at the side of plunger supporting member 32. The lifter 35, which is substantially in a bottomed-tubular shape and has an opening at one end, is integrated with the plunger 31 via the lower seat 34. The lifter 35 accommodates the plunger spring 36. The plunger spring 36 is retained by the housing body 11 at one end and retained by the lower seat 34 at the other end. The lower side of the lifter 35 in FIG. 1 is in contact with a cam of a camshaft (none shown), and thereby the lifter 35 is movable back and forth in the axial direction in response to rotation of the camshaft along a cam profile. Thus, the plunger 31 moves back and forth in the axial direction. The plunger spring 36 biases the lifter 35, and thereby the lifter 35 is in contact with the cam surface. Thus, the plunger spring 36 functions as a retracting spring of the plunger 31.

As follows, the metering valve portion 50 will be described. The metering valve portion 50 includes a tubular portion 51, which is defined by the housing body 11, a valve cover 52, which surrounds an opening of the tubular portion 51, a connector 53, and a connector housing 54. The tubular portion 51 is substantially in a tubular shape and therein has a fuel passage 55 and a communication passage 16, which communicates the fuel passage 55 with the fuel chamber 13. The tubular portion 51 has an outer circumferential periphery provided with a rubber seal 17 to restrict fuel from leaking from the fuel passage 55. The fuel passage 55 is provided with a seat body 56, which is substantially in a tubular shape. The seat body 56 has an outer circumferential periphery provided with a rubber seal 57. The rubber seal 57 seals the seat body 56 from the inner wall of the tubular portion 51. According to the present structure, fuel passes through the seat body 56. The seat body 56 accommodates an inlet valve 58. The inlet valve 58 includes a bottom portion 59, which is substantially in a disc shape, and a wall portion 60, which is substantially in a tubular shape. The bottom portion 59 and the wall portion 60 therebetween define an inner space, in which a spring 61 is accommodated. The spring 61 is retained at one end by a retaining portion 62, which is located closer to the compression chamber 14 than the inlet valve 58. The retaining portion 62 is retained by a snap ring 63, which is mounted to the inner wall of the seat body 56. A needle 64 is in contact with the bottom portion 59 of the inlet valve 58. The needle 64 extends into the connector 53 through the valve cover 52. The connector 53 includes a coil 65 and a terminal 53a, via which the coil 65 is supplied with electricity. A stationary core 66, a spring 67, and a moving core 68 are held at a predetermined position inside the coil 65. The needle 64 is, for example, welded to the moving core 68. The moving core 68 and the needle 64 are integrated with each other. The spring 67 is retained by the stationary core 66 at one end and retained by the moving core 68 at the other end.

In the present structure, when electricity is supplied to the coil 65 through the terminal 53a of the connector 53, the coil 65 causes magnetic flux, and thereby the stationary core 66 and the moving core 68 therebetween cause magnetic attractive force. Thus, the moving core 68 moves toward the stationary core 66, and simultaneously the needle 64 moves away from the compression chamber 14. At this time, the needle 64 does not regulate movement of the inlet valve 58. Therefore, the bottom portion 59 of the inlet valve 58 can be seated to a seat portion 69 of the seat body 56. When the inlet valve 58 is seated to the seat portion, the fuel passage 55 is blocked from the compression chamber 14. Alternatively, when the connector 53 is not supplied with electricity via the terminal 53a, magnetic attractive force is not caused, and hence the moving core 68 moves to be away from the stationary core 66 by being applied with biasing force of the spring 67. Thus, the needle 64 moves toward the compression chamber 14. Consequently, the inlet valve 58 moves toward the compression chamber 14. At this time, the bottom portion 59 of the inlet valve 58 is lifted from the seat portion 69, and thereby the fuel passage 55 is communicated with the compression chamber 14.

As follows, the delivery valve portion 70 will be described. The delivery valve portion 70 includes an accommodating portion 18, a valve element 71, a spring 72, a retaining portion 73, and an outlet port 74. The accommodating portion 18 is substantially in a tubular shape and defined in the housing body 11. The accommodating portion 18 therein defines an accommodation chamber 19. The valve element 71, the spring 72, and the retaining portion 73 are accommodated in the accommodation chamber 19. The valve element 71 is applied with biasing force of the spring 72 and biased toward the compression chamber 14. The spring 72 is retained by the retaining portion 73 at one end. In the present structure, the valve element 71 blocks an opening of the accommodation chamber 19 at the side of the compression chamber 14 when pressure of fuel in the compression chamber 14 is low. Consequently, the compression chamber 14 is blocked from the accommodation chamber 19. Alternatively, when pressure of fuel in the compression chamber 14 becomes large sufficient to overcome the biasing force of the spring 72, the valve element 71 moves toward the outlet port 74. The valve element 71 has an inner space, which functions as a fuel passage. Fuel flows into the accommodation chamber, and the fuel is discharged from the outlet port 74 through the inner space of the valve element 71. Thus, the valve element 71 operates as a check valve to intermit fuel discharge.

Next, a block configuration of a fuel supply apparatus 100 including the high-pressure pump 10 will be described with reference to FIG. 2. The fuel supply apparatus 100 shown in FIG. 2 includes an electronic control unit (ECU) 101, which is electrically connected with the terminal 53a of the connector 53 so as to control electricity supplied to the coil 65. In the present structure, the ECU 101 controls the needle 64 of the metering valve portion 50. The fuel supply apparatus 100 includes the ECU 101 and a fuel-pressure sensor 102. The ECU 101 is a microcomputer including a CPU, a ROM, a RAM, and an I/O device and having a bus line connecting thereamong. The ECU 101 according to the present embodiment includes a fuel-pressure control portion 103 and a drive circuit 104. The fuel-pressure sensor 102 detects pressure of fuel discharged from the outlet port 74 (FIG. 1). The fuel-pressure sensor 102 is provided in a fuel rail portion downstream of the outlet port 74 of the delivery valve portion 70. The fuel-pressure sensor 102 is not limited to be provided in the fuel rail portion and may be provided in any other locations in which the fuel-pressure sensor 102 can detect the fuel pressure. The fuel-pressure control portion 103 receives a detection signal from the fuel-pressure sensor 102. The fuel-pressure control portion 103 manipulates the drive circuit 104 based on the detection signal from the fuel-pressure sensor 102 so as to control the fuel pressure at a target pressure. The drive circuit 104 supplies electricity to the high-pressure pump 10. More specifically, the drive circuit 104 is configured to supply two kinds of driving current signals in accordance with a drive signal from the fuel-pressure control portion 103.

As follows, an operation of the high-pressure pump 10 will be described. As the camshaft rotates, the plunger 31 moves back and forth in the axial direction. More specifically, as shown by the cam lift in FIG. 3, the plunger 31 moves back and forth between a top dead center and a bottom dead center in accordance with change in the cam angle. The operation of the high-pressure pump 10 including (1) suction stroke, (2) return stroke, and (3) pressurization stroke will be described.

(1) Suction Stroke

Figure 3:
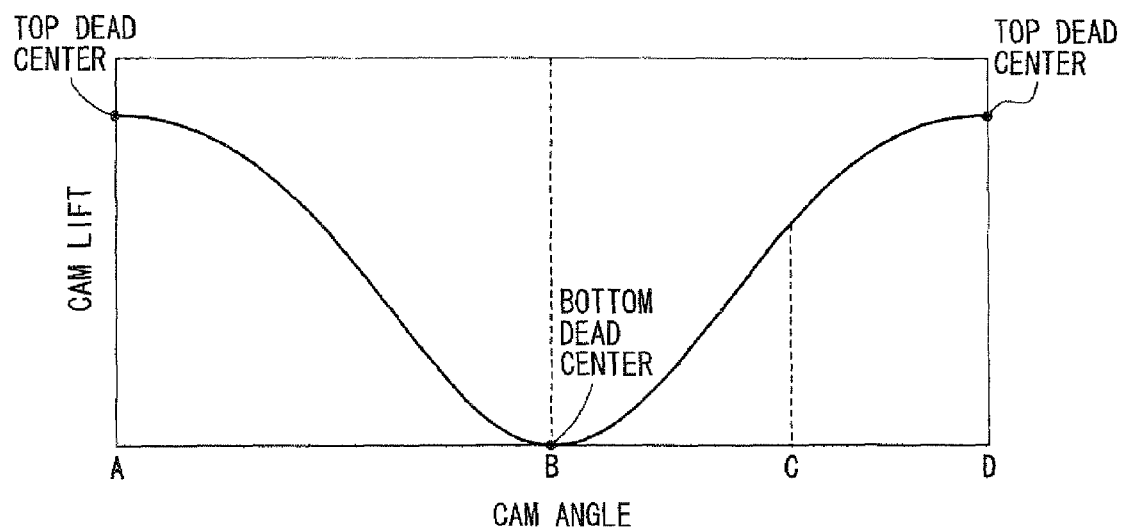
FIG. 3 is a graph showing a relationship between a cam lift and a cam angle of an engine provided with the high-pressure pump of the fuel supply apparatus according to the first embodiment.

In the transition from A to B in FIG. 3, the plunger 31 moves downward in FIG. 1. In the present suction stroke A to B, electricity supply to the coil 65 is terminated. Thereby, the inlet valve 58 is biased from the spring 67 toward the compression chamber 14 via the needle 64, which is integrated with the moving core 68. In the present condition, the moving core 68 and the needle 64 are in opened positions, and the inlet valve 58 is lifted from the seat portion 69 of the seat body 56. Thereby, the fuel chamber 13 communicates with the compression chamber 14. In the present state, pressure in the compression chamber 14 decreases. Thus, fuel is drawn from the fuel chamber 13 into the compression chamber 14.

(2) Return Stroke

In the transition from B to C in FIG. 3, the plunger 31 moves upward from the bottom dead center toward the top dead center. In the present return stroke B to C, the fuel pressure in the compression chamber 14 increases, whereby fuel in the compression chamber 14 exerts force to the inlet valve 58 in a direction in which the inlet valve 58 is seated to the seat portion 69 of the seat body 56. In a condition, in which the coil 65 is not supplied with electricity, the needle 64 is moved toward the compression chamber 14 by being applied with biasing force of the spring 67. In the present structure, the inlet valve 58 is lifted from the seat portion 69 of the seat body 56 when the coil 65 is not supplied with electricity. Thus, contrary to the suction stroke, as the plunger 31 move upward, fuel is returned from the compression chamber 14 to the fuel chamber 13.

(3) Press-Feed Stroke

When the coil 65 is supplied with electricity in the course of the return stroke, the coil 65 causes a magnetic field and forms a magnetic circuit. Thus, the stationary core 66 and the moving core 68 therebetween generate magnetic attractive force. When the magnetic attractive force between the stationary core 66 and the moving core 68 becomes greater than the biasing force of the spring 67, the moving core 68 moves toward the stationary core 66. In this condition, the needle 64, which is integrated with the moving core 68, also moves toward the stationary core 66. Thus, the moving core 68 and the needle 64 are moved to closed positions. When the needle 64 moves toward the stationary core 66, the inlet valve 58 is spaced from the needle 64. Consequently, at the point C in FIG. 3, the inlet valve 58 is seated to the seat portion 69 of the seat body 56 by being applied with the biasing force of the spring 61 and fuel pressure in the compression chamber 14. When the inlet valve 58 is seated to the seat portion 69, the fuel chamber 13 is blocked from the compression chamber 14. Thus, the return stroke, in which fuel is returned from the compression chamber 14 to the fuel chamber 13, is terminated. In the present structure, an amount of fuel, which is returned from the compression chamber 14 to the fuel chamber 13, can be controlled by manipulating the time point, at which the fuel chamber 13 is blocked from the compression chamber 14. Simultaneously, an amount of fuel pressurized in the compression chamber 14 can be also controlled.

In the transition from C to D in FIG. 3, the plunger 31 further moves toward the top dead center in the condition where the compression chamber 14 is blocked from the fuel chamber 13, and thereby the plunger 31 further increases fuel pressure in the compression chamber 14. When the fuel pressure in the compression chamber 14 becomes greater than a predetermined pressure, the valve element 71 of the delivery valve portion 70 moves away from the compression chamber 14. Thereby, the compression chamber 14 communicates with the accommodation chamber 19, and fuel pressurized in the compression chamber 14 is discharged from the outlet port 74. Thus, fuel discharged from the outlet port 74 is supplied to the injector through the fuel rail portion. At the time point D in FIG. 3, the plunger 31 moves upward to reach the top dead center. In the present state, the plunger 31 again starts moving downward in FIG. 1. Electricity supply to the coil 65 is stopped when pressure in the compression chamber 14 increases to a predetermined pressure. Specifically, the inlet valve 58 is applied with fuel pressure in the compression chamber 14, and the inlet valve 58 is seated to the seat portion 69 of the seat body 56 when the fuel pressure in the compression chamber 14 increases sufficiently to move the inlet valve 58 regardless of the electricity supply to the coil 65. The high-pressure pump 10 pumps fuel by repeating the suction stroke, the return stroke, and the press-feed stroke. An amount of fuel discharged from the high-pressure pump 10 is controlled by manipulating a time point at which the coil 65 supplies electricity to the metering valve portion 50.

As follows, a control of the high-pressure pump 10 will be described with reference to a comparative example.

Figure 4:
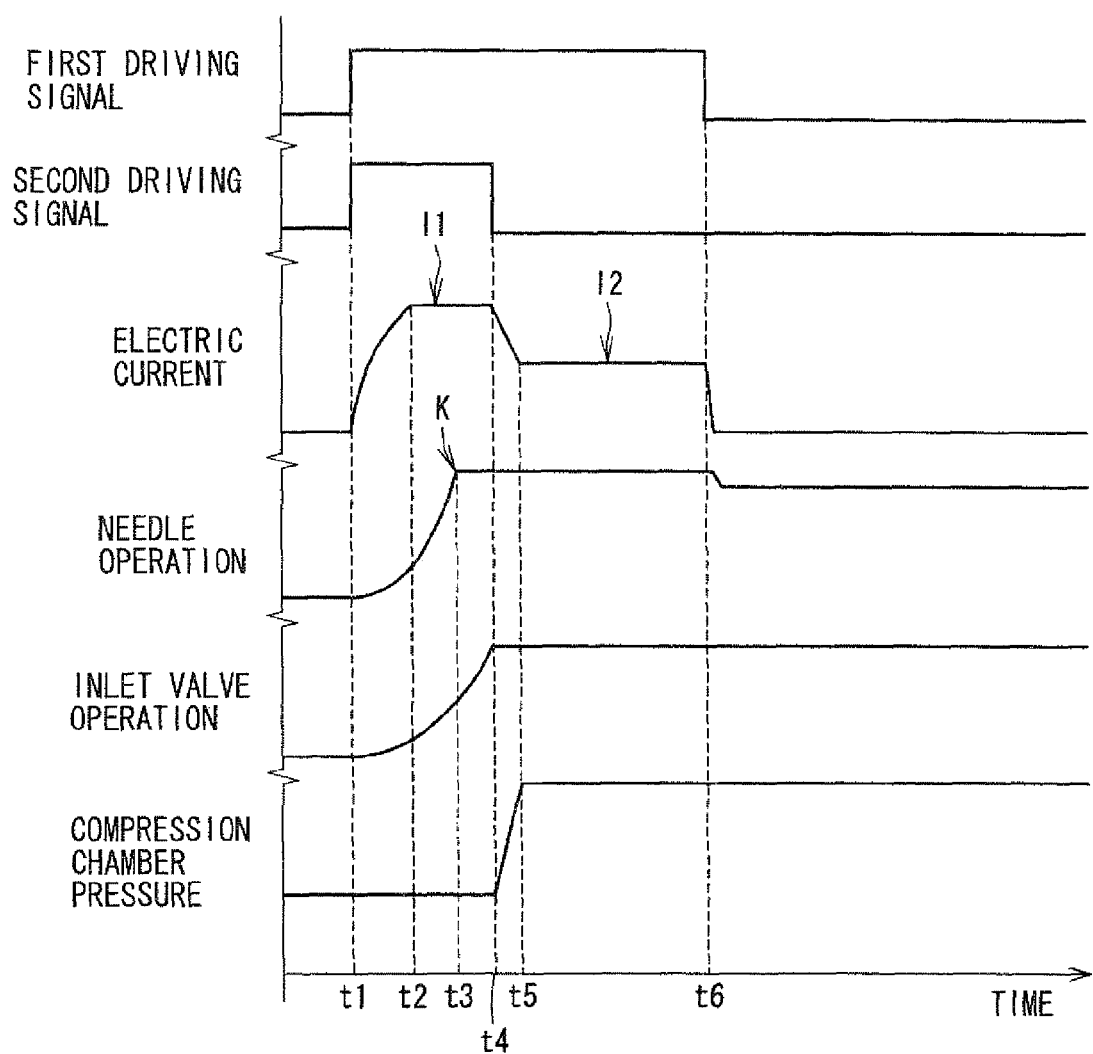
FIG. 4 is a time chart showing an operation of a fuel supply apparatus according to a comparative example.

FIG. 4 is a time chart according to a comparative example. The comparative example shown in FIG. 4 is related to a closing operation of the inlet valve 58 at the time point C in FIG. 3. As indicated by the inlet valve operation in FIG. 4, the inlet valve 58 is closed at the time point t4. As shown by the needle operation in FIG. 4I the needle 64, which is integrated with the moving core 681 moves in advance of the closing operation of the inlet valve 58. Further, as shown by the electric current in FIG. 4, in advance of the movement of the needle 64, electricity is supplied to the moving core 68 so as to cause the magnetic attractive force, Further, as shown by the first driving signal and the second driving signal in FIG. 4, in advance of the electricity supply to the moving core 68, two kinds of driving signals including the first driving signal and the second driving signal are outputted.

Figure 2:
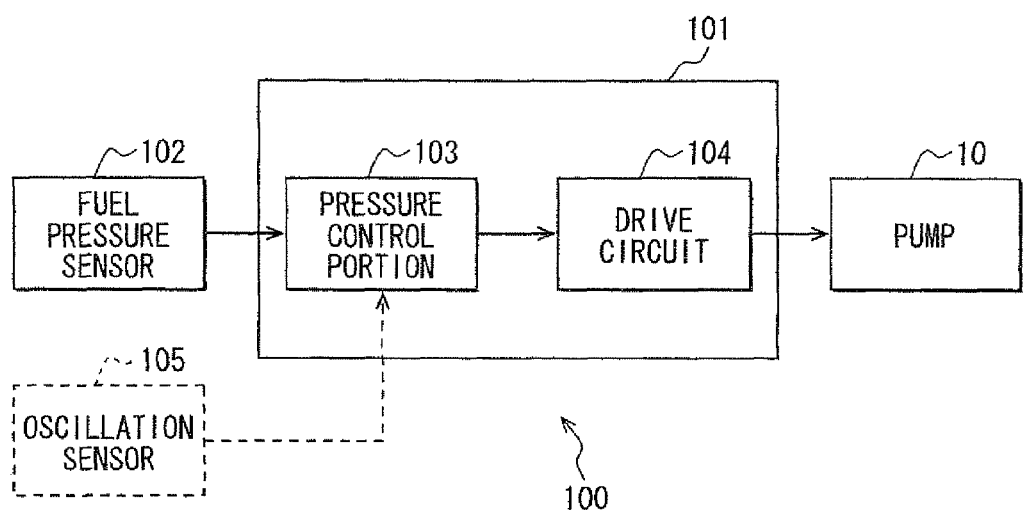
FIG. 2 is a block diagram showing the fuel supply apparatus according to the first embodiment.

The first driving signal and the second driving signal are outputted from the fuel-pressure control portion 103 of the ECU 101 as shown in FIG. 2. The fuel-pressure control portion 103 outputs the first driving signal and the second driving signal to the drive circuit 104. Thereby, the drive circuit 104 performs electricity supply to the high-pressure pump 10. Specifically, the drive circuit 104 switches values of a driving current and supplies the driving current in accordance with the first driving signal and the second driving signal outputted from the fuel-pressure control portion 103. More specifically, the drive circuit 104 supplies electricity during a time period in which the first driving signal is at the high level. In the present electricity supply, the drive circuit 104 supplies a relatively large first driving current I1, when the second driving signal is at the high level, and supplies a relatively small second driving current I2 when the second driving signal is at the low level. More specifically, the first driving current is sufficient for moving the moving core 68 and the needle 64 from the opened position to the closed position, and the second driving current is sufficient for holding the moving core 68 and the needle 64 at the closed position so as to maintain the closed state of the inlet valve 58. In the present structure, the electricity supply is performed according to the first driving current I1 and the second driving current I2. For example, when the fuel pressure in the compression chamber 14 increases, electric power is reduced by supplying relatively small electricity of the second driving current I2 subsequent to the closing operation of the inlet valve 58.

Referring to FIG. 4, at the time point t1, both the first driving signal and the second driving signal are activated and at the high-level, and thereby electricity supplied from the drive circuit 104 starts increasing at the time point t1. In the time period between the time points t2 and t4, electricity of the first driving current I1 is supplied. Subsequently, in the time period between the time points t5 and t6, electricity of the second driving current I2 is supplied. At the time point t1, the electricity supply is started so as to cause the magnetic attractive force, and thereby the moving core 68 moves away from the compression chamber 14. Thus, the needle 64 moves integrally with the moving core 68. In FIG. 4, the needle 64 completes its movement at the time point t3. In the present condition, the inlet valve 58 is spaced from the needle 64, and thereafter, as shown by the inlet valve operation in FIG. 4, the inlet valve 58 is closed at the time point t4. Thereby, as shown by the compression chamber pressure in FIG. 4, pressure in the compression chamber 14 starts increasing from the time point t4.

According to the present comparative example, the second driving signal is set at the low level at the time point t4, at which the inlet valve 58 is closed. Thereafter, the electricity of the second driving current I2 is supplied in the time period between the time point t5 and the time point t6. The present decrease in the electricity supply is performed, since it suffices that the inlet valve 58 is maintained at the closed state after the inlet valve 58 is once operated at the closed state. However, according to the present comparative example, the inlet valve 58 is supplied with electricity of the first driving current I1 to the time point t4, at which the inlet valve 58 is completely in the closed state. Therefore, the motion of the needle 64 indicated by the inclination K of the needle operation at the time point t3 becomes large. In the present condition, for example, the stationary core 66 and the moving core 68 therebetween cause impact noise, and consequently the needle 64 causes large operation sound.

Figure 5:
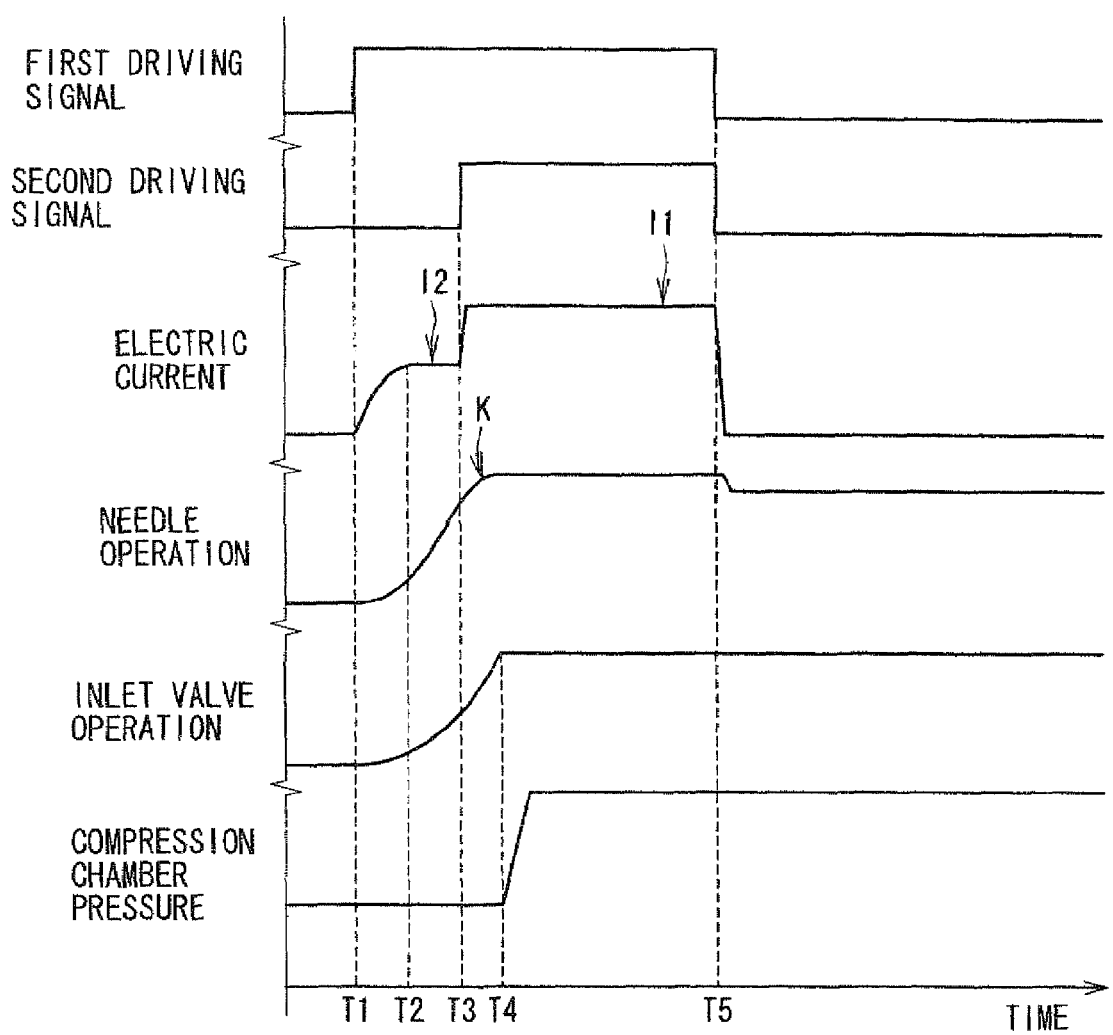
FIG. 5 is a time chart showing an operation of the fuel supply apparatus according to the first embodiment.

Therefore, according to the present embodiment, a time period (energization period), in which electricity of the first driving current I1 and the second driving current I2 is supplied to the high-pressure pump 10, is controlled. FIG. 5 is a time chart showing an operation of the fuel supply apparatus 100 according to the present first embodiment.

In the comparative example, both the first driving signal and the second driving signal are set at the high level at the time point t1. Further, the second driving signal is set at the low level at the time point t4, at which the inlet valve 58 is closed. In the comparative example in FIG. 4, the moving core 68 and the needle 64 are supplied with the relatively large first driving current I1 and thereby moved from the opened position to the closed position.

On the contrary, according to the present first embodiment, at the time point T1, only the first driving signal is set at the high level. In the present operation, as shown in FIG. 5, the electricity starts increasing at the time point T1, and the electricity of the relatively small second driving current I2 is supplied in the time period between the time points T2 and T3. At the time point T3, the needle 64 is close to the closed position, and the second driving signal is set at the high level. Thus, electricity of the first driving current I1 is supplied in the course of the electricity supply operation. In the present operation, electricity of the relatively small second driving current I2 is initially supplied. Thereafter, at the time point, at which the needle 64 moves by a predetermined distance, electricity of the relatively large first driving current I1 is supplied to complete the movement of the needle 64. According to the present operation, increasing in speed of the needle 64, which is shown by the inclination K in FIG. 5, can be reduced, and thereby soft landing of the needle 64 can be performed. In the present operation, impact noise caused between the stationary core 66 and the moving core 68 can be constrained, and thereby operation sound of the needle 64 can be reduced. Furthermore, in the present operation, the electricity supply is finally switched to the relatively large first driving current I1, and thereby the needle 64 can be steadily moved to the closed position even when the time period, in which electricity of the second driving current I2 is supplied, becomes large and the magnetic attractive force becomes insufficient. When the time period (first electricity switch period), in which the second driving signal is set at the low level, becomes large, completion of the movement of the needle 64 is delayed and retarded. As a result, the closing operation of the inlet valve 58 becomes slow, and a closing time point, at which the inlet valve 58 closes, is retarded. When the closing time point of the inlet valve 58 is retarded, the return stroke of the high-pressure pump 10, which is described in the clause (2), becomes large. Consequently, the compression stroke, which is described in the clause (3), becomes short. Therefore, when the first electricity switch period is excessively large, the pumping performance of the high-pressure pump 10 may be lowered and degraded.

Figure 6:
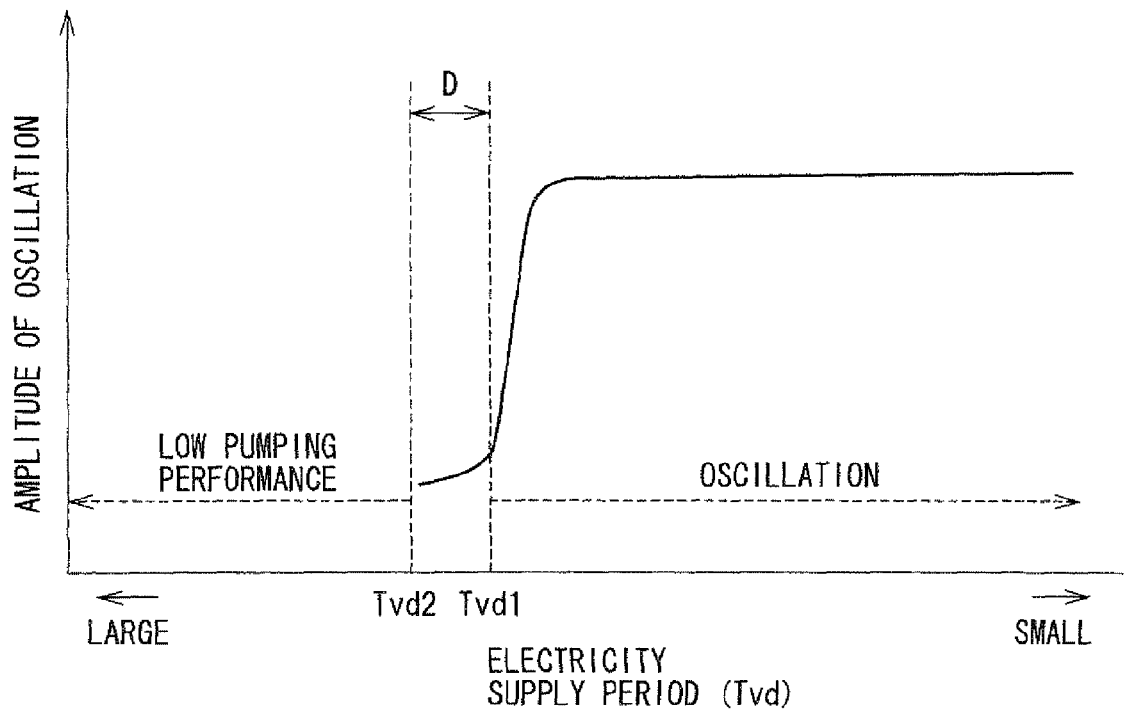
FIG. 6 is a graph showing a first electricity switch period and an amplitude of oscillation according to the first embodiment.

FIG. 6 shows a relationship of the degradation in the pumping performance (low pumping performance) and oscillation. According to FIG. 6, when the first electricity switch period Tvd is smaller than Tvd1, the amplitude of oscillation rapidly increases, and operation sound becomes large. Alternatively, when the first electricity switch period Tvd becomes greater than Tvd2, the pumping performance is lowered. Therefore, in the present embodiment, a learning processing is performed so as to set the first electricity switch period Tvd within the range D in FIG. 6.

As follows, the learning processing for setting the first electricity switch period Tvd will be described. Hereafter, the control of the fuel-pressure control portion 103 shown in FIG. 2 will be described further in detail. In the ECU 101, the fuel-pressure control portion 103 outputs the first driving signal and the second driving signal to the drive circuit 104 based on the signal of fuel pressure from the fuel-pressure sensor 102. The fuel-pressure control portion 103 sets only the first driving signal at the high level at the time point T1 in FIG. 5 in order to close the inlet valve 58. The fuel pressure detected by the fuel-pressure sensor 102 is feedback controlled at a target pressure by manipulating the time point T1 (electricity supply start point). In the present operation, as the fuel pressure detected by the fuel-pressure sensor 102 decreases, the time point T1 advances in time. Thereby, electricity supply is advanced and performed at an earlier time point, and the closing operation of the inlet valve 58 is accelerated (advanced). The first driving signal of the fuel-pressure control portion 103 is set at the high level at the electricity supply start point (spill valve closing point epduty). The spill valve closing point epduty is set at the top dead center D, which is shown in FIG. 3, as a reference point. As the closing time point is advanced, the spill valve closing point epduty is increased. Alternatively, as the closing time point is retarded, the spill valve closing point epduty is decreased. The spill valve closing point epduty is equivalent to the electricity supply start point.

Figure 7:
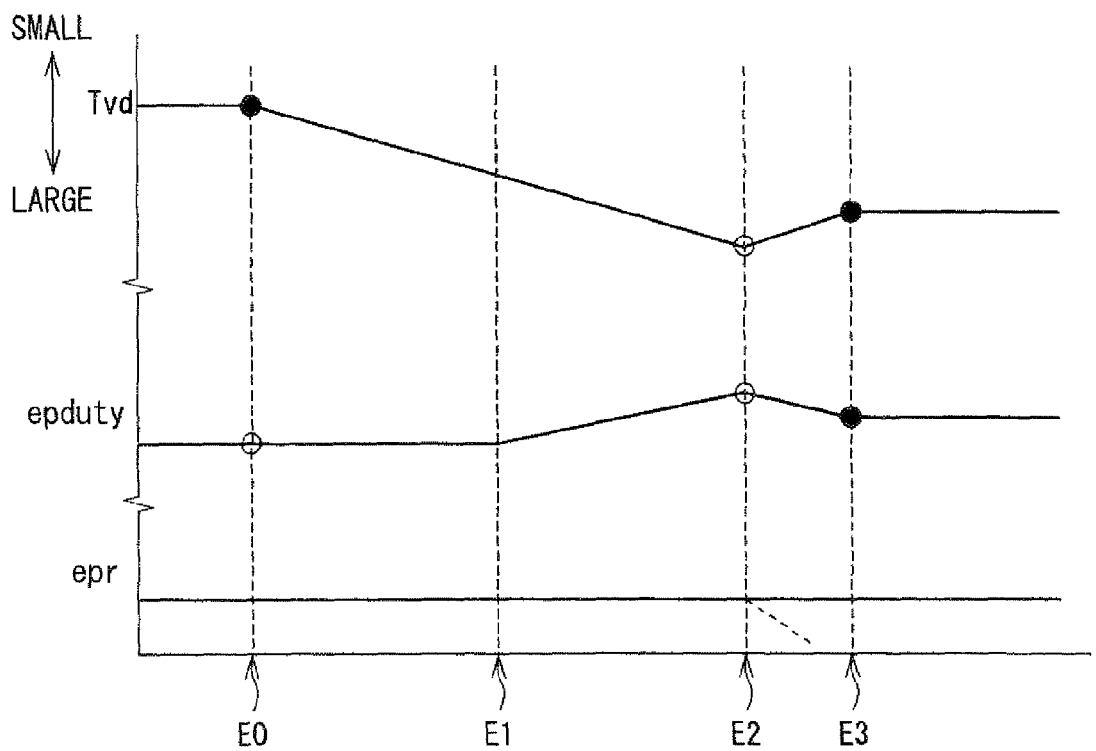
FIG. 7 is a time chart showing a learning processing of the fuel supply apparatus according to the first embodiment.

In the present structure, as shown in FIG. 7, the first electricity switch period Tvd is gradually increased from an initial value of zero in the time period between E0 and E1. In FIG. 7, the first electricity switch period Tvd becomes small in the upward direction and becomes large in the downward direction. As the first electricity switch period Tvd becomes large, a time period from the time point, at which the first driving signal is set at the high level (from a spill valve closing point), to a time point at which the second driving signal is set at the high-level, becomes large. Referring to FIG. 5, when the first electricity switch period Tvd increases such that the needle 64 performs the soft landing, the closing time point of the inlet valve 58 is retarded. At this time, the first electricity switch period Tvd is substantially equivalent to Tvd1 in FIG. 6. In this case, an amount of fuel discharged from the high-pressure pump 10 decreases, and consequently the fuel pressure detected by the fuel-pressure sensor 102 decreases. Thus, as shown in FIG. 7, the spill valve closing point epduty is increased in the period E1 to E2. As a result, the electricity supply is advanced. The first electricity switch period Tvd is further increased, and the fuel pressure epr cannot be feedback controlled at the target pressure by advancing the electricity supply at a limit point E2 in FIG. 7. At this time, the first electricity switch period Tvd is substantially equivalent to Tvd2 in FIG. 6. According to the present embodiment, at E2 in FIG. 7, the first electricity switch period Tvd is temporarily learned and stored. Thereafter, the first electricity switch period Tvd is increased to a target value, and the increased first electricity switch period Tvd is further learned (final learning processing). The present target value is, for example, half of an increase (Δepduty) of the spill valve closing point epduty at E2 in FIG. 7. According to the present operation, the first electricity switch period Tvd is set at a substantially middle point in the range D in FIG. 6.

The learning processing according to the present embodiment will be described further in detail with reference to the flow chart in FIG. 8.

At step S100, it is determined whether a learning condition is satisfied. The present processing is performed by determining whether a learning flag extv is ON. The learning flag extv is set to ON when the learning condition is satisfied in the following processings. When the learning flag extv is ON, S100 makes a positive determination. In this case, at subsequent S110, the first electricity switch period Tvd is increased. Thus, the processing proceeds to S120. At S110, the first electricity switch period Tvd is replaced with a value, which is the sum of the first electricity switch period Tvd and a predetermined value. When the learning flag extv is OFF, S100 makes a negative determination. In this case, the processing proceeds to S160.

At S120, it is determined whether the fuel pressure begins decreasing. The present processing at S120 corresponds to the determination at E2 in FIG. 7. When it is determined that the fuel pressure begins decreasing, a positive determination is made at S120, and the processing proceeds to S130. Alternatively, when the fuel pressure is constantly maintained, a negative determination is made at S120, and the processing proceeds to S160. At S130, a temporary learning processing is performed. Specifically, in the present processing, a temporary learning processing value Tvpre is replaced with the present first electricity switch period Tvd. Subsequently, at S140, the temporary learning value Tvpre is added with a return value M to be a final learning value Tvcal.

Subsequently, at S150, the spill valve closing point epduty is updated. Specifically, at S150, the spill valve closing point epduty, which is advanced and changed, is stored, and the learning flag extv is reset to OFF. Thus, the processing proceeds to S160 subsequent to S150. Alternatively, the processing proceeds to S160 when S100 or S120 makes a negative determination. At S160, the first electricity switch period Tvd is replaced with the learning value Tvcal, and thereafter, the present learning processing is terminated.

As follows, a learning condition determination will be described. The present processing is executed for determining whether the learning condition is satisfied. When the learning condition is determined to be satisfied in the present learning condition determination, the learning flag extv is set to ON. First, at S200, it is determined whether the learning flag extv is ON. When the learning flag extv is determined to be ON, a positive determination is made at S200. In this case, the present learning condition determination is terminated without execution of the subsequent processings. When the learning flag extv is determined to be OFF, S200 makes a negative determination. In this case, the processing proceeds to S210.

At S210, it is determined whether the present operation is a steady operation. The present processing at S210 is performed by determining whether the engine rotation speed and the engine load are respectively less than predetermined values. In addition to the present determination, it may be determined whether the present operation is in an idle state. Specifically, it may be determined whether the vehicle speed is substantially zero and/or whether an accelerator is not manipulated so as to determine the idle state. Instead of the determination of the idle state, it may be determined whether the fuel pressure is less than a predetermined value and/or whether a variable cam timing device (VCT device) is not operated. When it is determined that the present operation is the steady operation, a positive determination is made at S210, and the processing proceeds to S220. When the present operation is determined not to be the steady operation, a negative determination is made at S210. In this case, the present learning condition determination is terminated without execution of the subsequent processings.

At S220, it is determined whether an engine cooling water temperature is greater than a predetermined value S0. When it is determined that the engine cooling water temperature is greater than or equal to S0, S220 makes a positive determination. In this case, at S230, the learning flag extv is set to ON, and thereafter the learning condition determination is terminated. When the engine cooling water temperature is determined to be less than S0, a negative determination is made at S220. In this case, the present learning condition determination is terminated without execution of the processing at S230.

Figure 9:
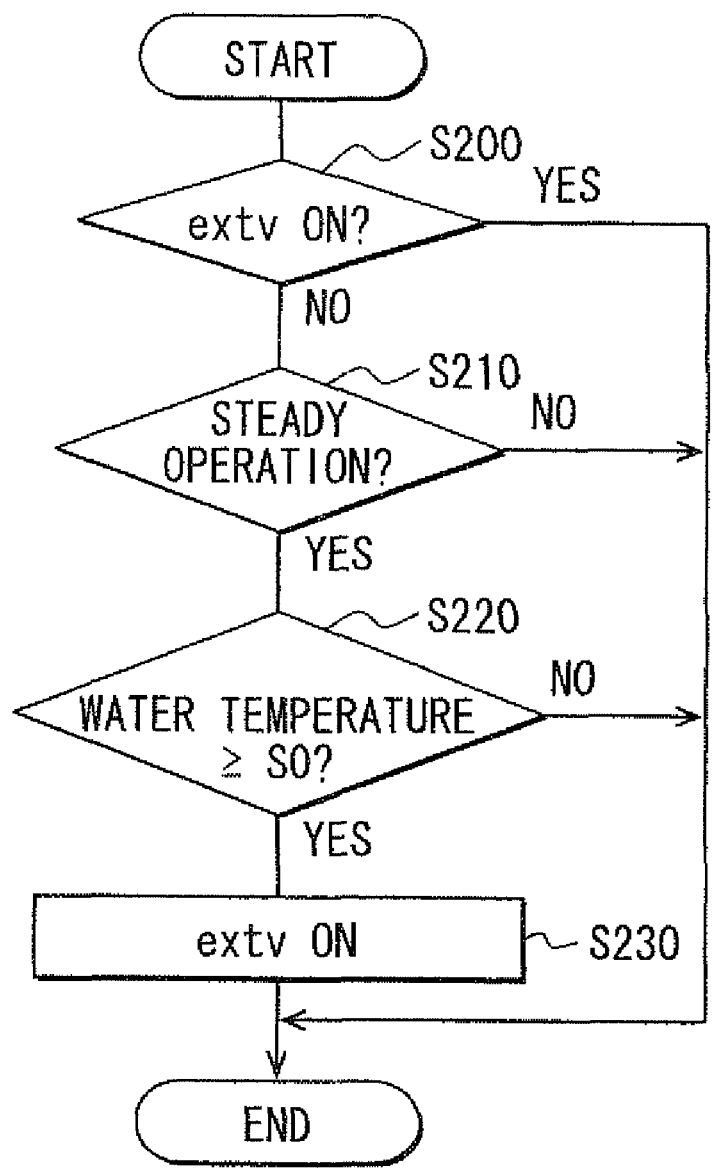
FIG. 9 is a flow chart showing a learning condition determination for the learning processing according to the first embodiment.

According to the present embodiment, as determined at S210 in FIG. 9, the learning processing is executed at least in the steady operation. That is, the condition for executing the learning processing includes continuation of the steady state. The reason will be described as follows. In the present description, (a) a relationship between the engine rotation speed and a learning condition will be first described, and subsequently (b) a relationship between the engine load and a learning condition will be described afterwards.

(a) Relationship Between Engine Rotation Speed and Learning Condition

Figure 10A:
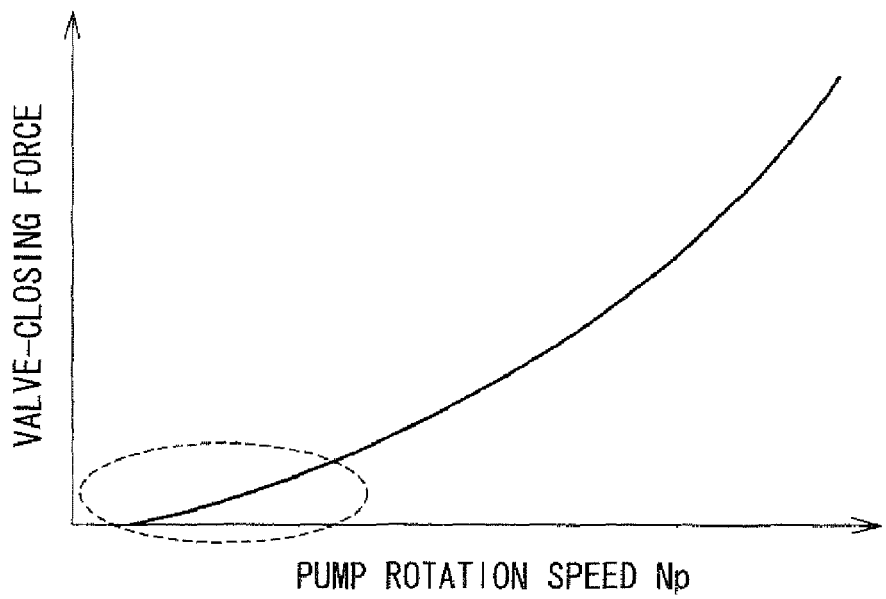
FIG. 10A is a graph showing a relationship between a pump rotation speed and a valve-closing force.
Figure 10B:
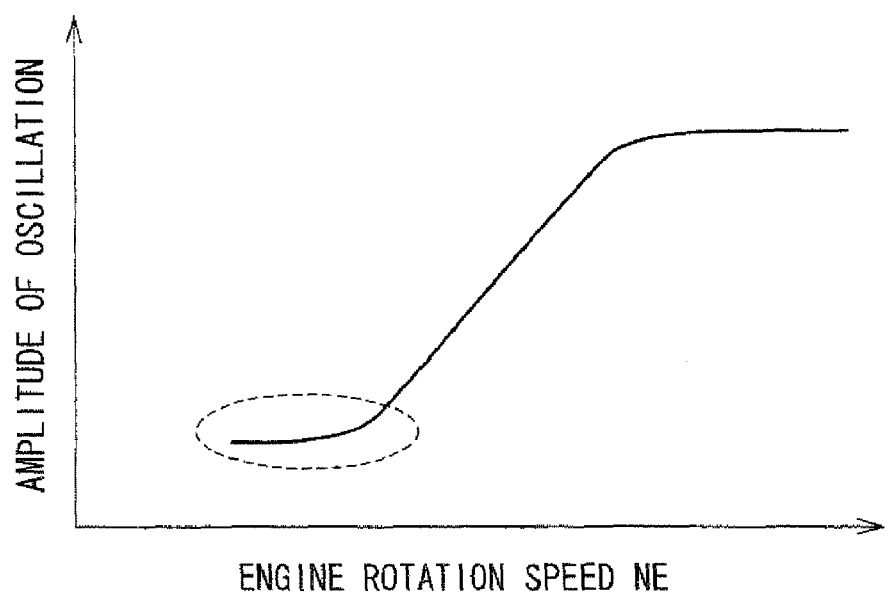
FIG. 10B is graph showing a relationship between an engine rotation speed and the amplitude of oscillation.

In FIG. 10A, as generally known, valve-closing force exerted to the inlet valve 58 becomes large with increase in a pump rotation speed Np. The pump rotation speed Np is the same as a rotation speed of the camshaft. As the pump rotation speed Np becomes large, increase in pressure in the compression chamber 14 caused by the plunger 31 is accelerated, and thereby the valve-closing force exerted to the inlet valve 58 is increased. It is noted that the pump rotation speed Np is substantially in proportion to the engine rotation speed NE. Therefore, as shown in FIG. 10B, as the engine rotation speed NE becomes high, the pump rotation speed Np increases, and thereby the valve-closing force becomes large. As a result, the amplitude of oscillation becomes large. That is, as the engine rotation speed NE increases, operation noise becomes large. Further, as shown in FIG. 10B, the amplitude of oscillation is relatively small in a range in which the engine rotation speed NE is low. Specifically, as indicated by the portion enclosed with the dashed line in FIG. 10B, the oscillation is maintained at the low level in the idling state, and rapid increase in the oscillation is not observed immediately after starting of running of the vehicle. As described above with reference to FIG. 10A, the valve-closing force becomes high with increase in the pump rotation speed Np, and thereby the closing time point of the inlet valve 58 is advanced. Therefore, the first electricity switch period Tvd, which is learned in the range where the engine rotation speed NE is low, is preferably used in the state where the engine rotation speed NE is high. In this case, an amount of discharged fuel can be sufficiently maintained. Therefore, the learning processing is desirably performed when the engine rotation speed NE is less than a predetermined value.

(b) Relationship Between the Engine Load and Learning Condition

Figure 11A:
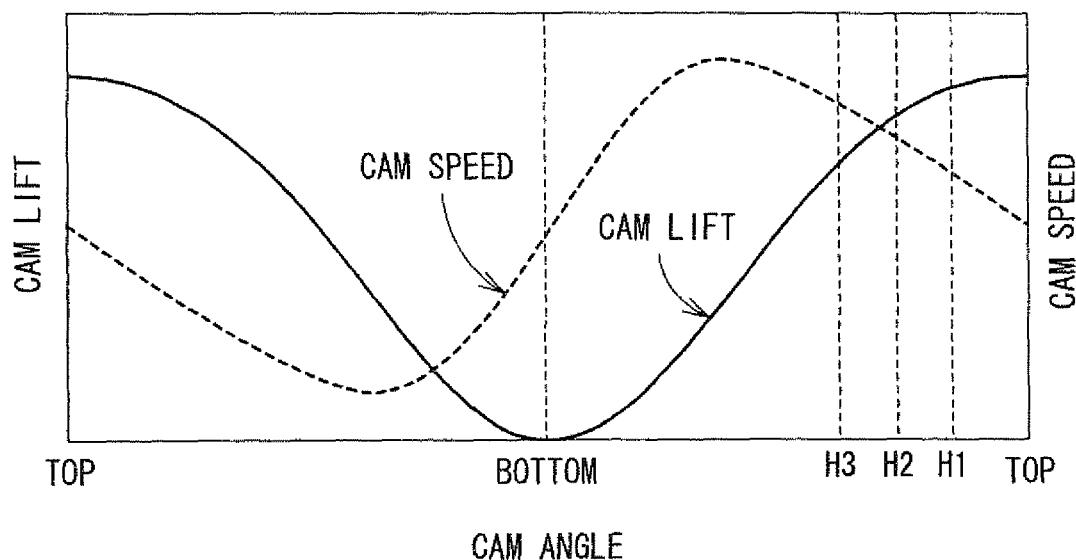
FIG. 11A is a graph showing a relationship between a cam angle and a cam lift.
Figure 11B:
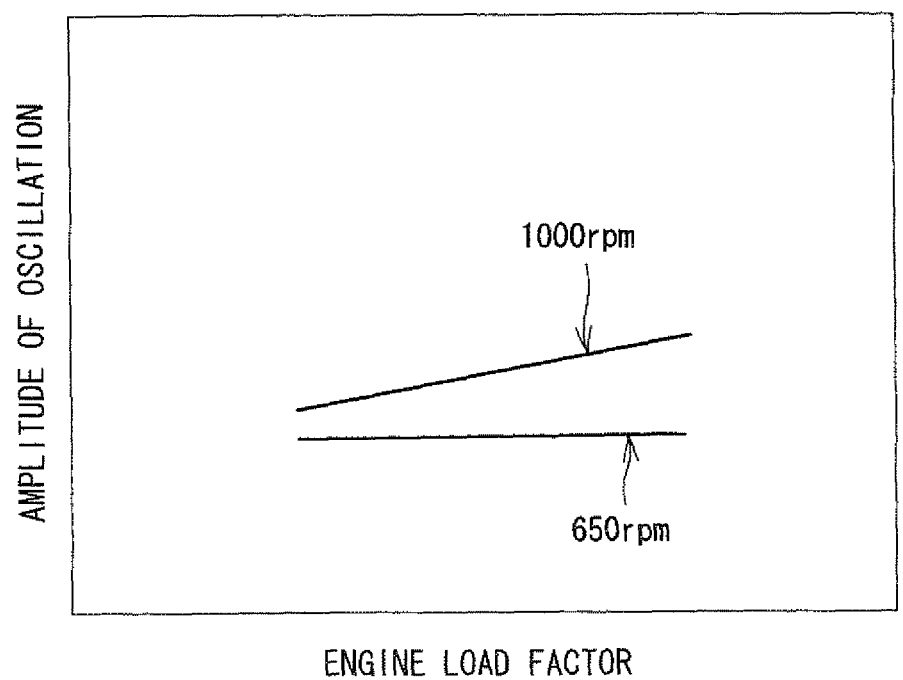
FIG. 11B is graph showing a relationship between an engine load and the amplitude of oscillation.

In FIG. 11A, the cam speed (speed of the plunger 31) is indicated by a dotted curved line and the cam lift is indicated by a solid curved line. In FIG. 11A, values of the engine load H1, H2, H3 have a relationship of H1<H2<H3. In FIG. 11A, as the engine load becomes high, the cam speed increases. Each of the solid lines in FIG. 11B shows a relationship between an engine load factor and the amplitude of oscillation. One of the solid lines indicates the relationship when the engine rotation speed NE is 650 rpm, and the other indicates the relationship when the engine rotation speed NE is 1000 rpm. When the engine rotation speed NE is 650 rpm, the amplitude of oscillation is substantially constant relative to change in the engine load factor. When the engine rotation speed NE is 1000 rpm, the amplitude of oscillation becomes slightly high as the engine load factor increases. Therefore, the first electricity switch period Tvd, which is learned in the range where the engine load is low, is preferably used in the state where the engine load is high. In this case, an amount of discharged fuel can be sufficiently maintained, similarly to the state where the engine rotation speed NE is high. Therefore, the learning processing is desirably performed when the engine load is less than a predetermined value.

Figure 12A:
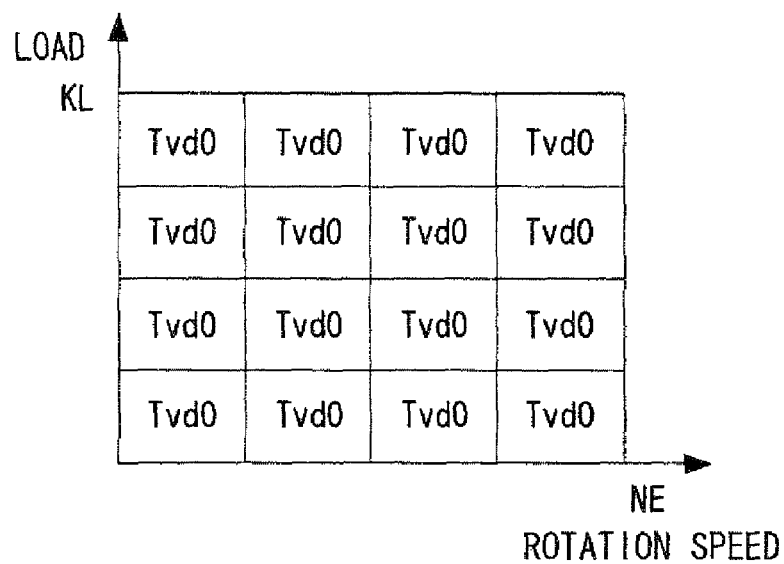
FIGS. 12A, 12B are graphs each showing a data map for the learning processing in each of range segments.

In view of the relationships (a), (b), the learning condition is desirably determined to be satisfied when both the engine rotation speed NE and the engine load are respectively less than the predetermined values. When the learning condition is determined according to the engine rotation speed NE and the engine load, the learning condition may be determined to be satisfied in multiple operating ranges, which are defined based on the operation state. For example, as shown in FIG. 12A, four ranges of the engine rotation speed NE and four ranges of the engine load KL may be defined. In this case, sixteen operation range segments are defined, and the learning processing may be performed in each of the operation range segments. According to the present operation, the first electricity switch period Tvd can be further desirably obtained.

Figure 12B:
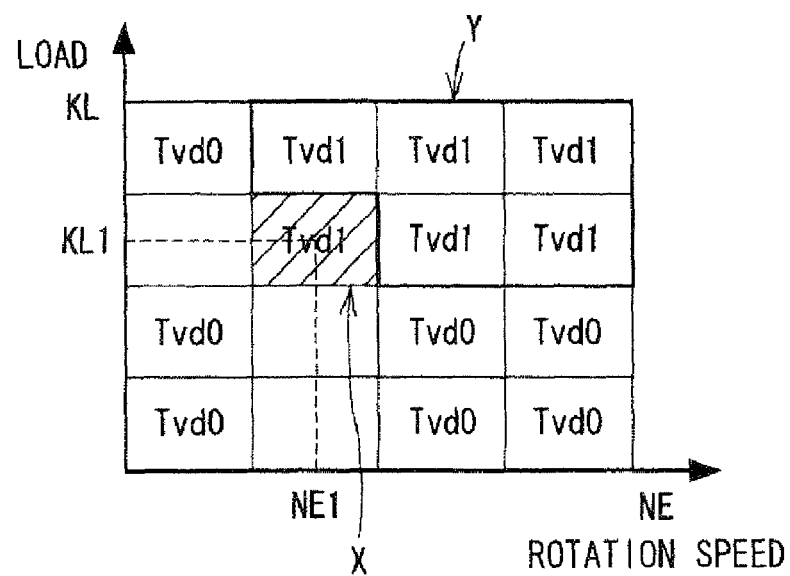

As described above, when the first electricity switch period Tvd is learned in the state where the engine rotation speed NE is low, and the learning value of the first electricity switch period Tvd is used in the state where the engine rotation speed NE is high, an amount of discharged fuel may be sufficiently maintained. In addition, when the first electricity switch period Tvd is learned in the state where the engine load is low, and the learning value of the first electricity switch period Tvd is used in the state where the engine load is high, an amount of discharged fuel may be also sufficiently maintained. Therefore, when the first electricity switch period Tvd is learned in each of the multiple operation range segments, the learning value, which is obtained in a specific operation range segment, may be used in an operation range segment, which is higher in the higher rotation speed and the higher load than the specific operation range segment. Specifically, the first electricity switch period Tvd is learned in an operation range segment X, which is indicated by a hatch pattern in FIG. 12B, in which the engine rotation speed NE is NE1, and the engine load is KL1. In this case, the learning value of the operation range segment X may be used in the five operation range segments Y, which are enclosed by the thick solid line and higher than the operation range segment X in the engine rotation speed NE and the engine load KL. In FIG. 12B, the learning value Tvd1 is used in both the operation range segments X, Y.

Figure 13A:
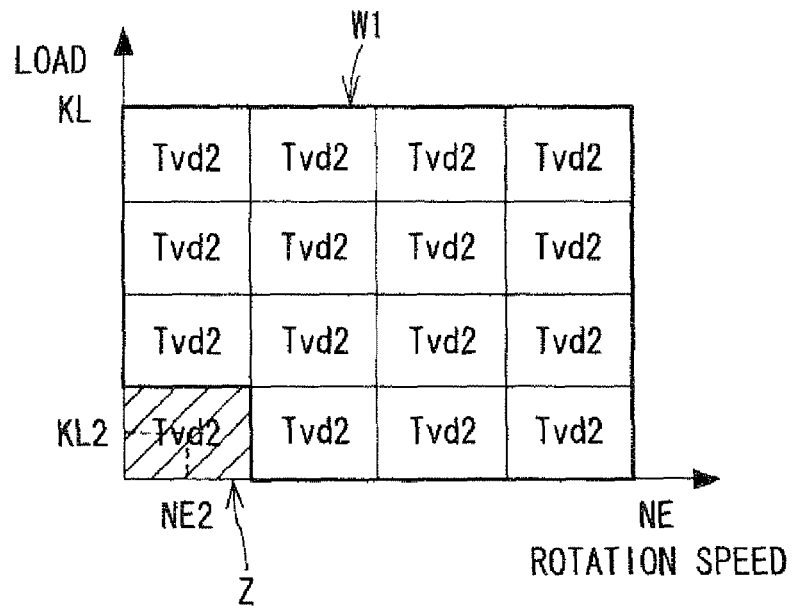
FIGS. 13A, 13B are graphs each showing a data map for the learning processing in each of range segments.
Figure 13B:
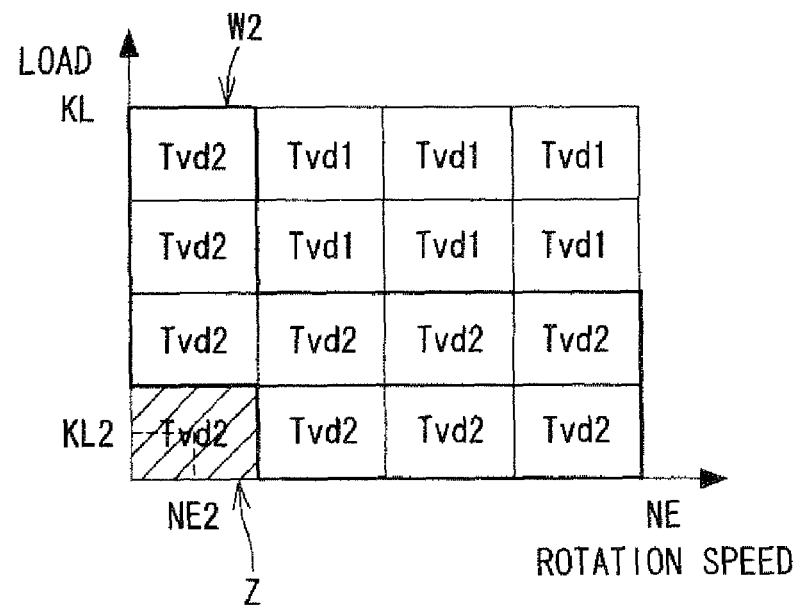

As shown in FIGS. 13A, 13B, a learning value is obtained in an operation range segment Z of low values of the engine rotation speed NE2 and the low engine load KL2. The engine rotation speed NE2 and the engine load KL2 are respectively less than the engine rotation speed NE1 and the engine load KL1. The learning value Tvd2 obtained in the operation range segment Z is, in general, greater than the learning value Tvd1. Therefore, as shown in FIG. 13A, the learning value Tvd2 may be used in the fifteen operation range segments W1, which is enclosed by the thick solid line and higher in the engine rotation speed NE and the engine load KL than the operation range segment Z. In FIG. 13B, the learning value Tvd2 is less than or equal to the learning value Tvd1 in specific operation range segments indicated by Tvd1. In this case, the learning value Tvd2 may be used in the operation range segment W2, which is higher in the engine rotation speed NE and the engine load KL than the operation range segment Z. The operation range segment W2 is enclosed by the thick solid line and out of the specific operation range segments. As described above, the learning processing is performed in each of the operation range segments, which are defined based on the engine rotation speed NE and the engine load KL. Alternatively, when the learning condition is determined based on the engine cooling water temperature at S220 in FIG. 9, the learning processing may be performed for each of multiple values of the engine cooling water temperature. Specifically, as described below, multiple water temperature ranges may be defined, and the learning processing may be performed in each of the water temperature ranges.

Figure 14:
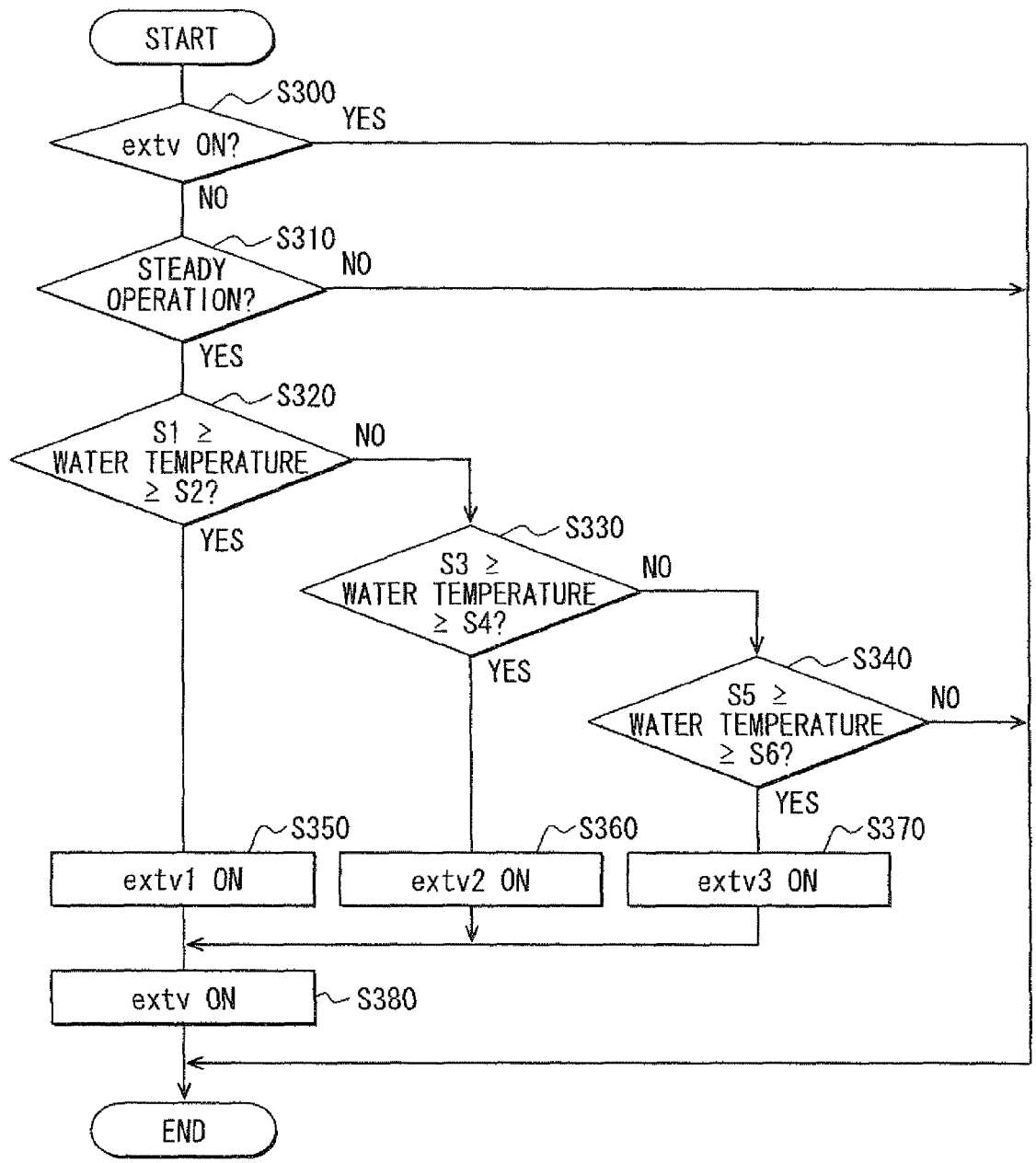
FIG. 14 is a flow chart showing a learning condition determination according to a modification of the first embodiment.

FIG. 14 is a flow chart showing a learning condition determination in which a learning condition is determined in each of the engine cooling water temperature ranges. First, at S300, it is determined whether the learning flag extv is ON. The present processing at S300 is similar to the processing at S200 in FIG. 9. When the learning flag extv is determined to be ON, a positive determination is made at S300. In this case, the present learning condition determination is terminated without execution of the subsequent processings. When the learning flag extv is determined to be OFF S300 makes a negative determination. In this case, the processing proceeds to S310.

At S310, it is determined whether the present operation is a steady operation. The present processing at S310 is similar to the processing at S210 in FIG. 9. When it is determined that the present operation is a steady operation, a positive determination is made at S310, and the processing proceeds to S320. When the present operation is determined not to be a steady operation, a negative determination is made at S310. In this case, the present learning condition determination is terminated without execution of the subsequent processings.

At S320, it is determined whether the engine cooling water temperature is in a first range. Specifically, it is determined whether the engine cooling water temperature is grater than or equal to S2 and less than or equal to S1. When it is determined that the engine cooling water temperature is in the first range, S320 makes a positive determination. In this case, at S350, a water temperature condition flag extv1 is set to ON, and thereafter the processing proceeds to S380. When the engine cooling water temperature is determined not to be in the first range, S320 makes a negative determination. In this case, the processing proceeds to S330.

At S330, it is determined whether the engine cooling water temperature is in a second range. Specifically, it is determined whether the engine cooling water temperature is grater than or equal to S4 and less than or equal to S3. When it is determined that the engine cooling water temperature is in the second range, S330 makes a positive determination. In this case, at S360, a water temperature condition flag extv2 is set to ON, and thereafter the processing proceeds to S380. When the engine cooling water temperature is determined not to be in the second range, S330 makes a negative determination. In this case, the processing proceeds to S340.

At S340, it is determined whether the engine cooling water temperature is in a third range. Specifically, it is determined whether the engine cooling water temperature is grater than or equal to S6 and less than or equal to S5. When it is determined that the engine cooling water temperature is in the third range, S340 makes a positive determination. In this case, at S370, a water temperature condition flag extv3 is set to ON, and thereafter the processing proceeds to S380. When the engine cooling water temperature is determined not to be in the third range, S340 makes a negative determination. In this case, the present learning condition determination is terminated.

At S380, which is subsequent to each of S350, S360, S370, the learning flag extv is set to ON, and thereafter the learning condition determination is terminated. The learning flag extv of S380 is set to ON when the learning condition of the water temperature in one of the first to third ranges is satisfied.

Figure 8:
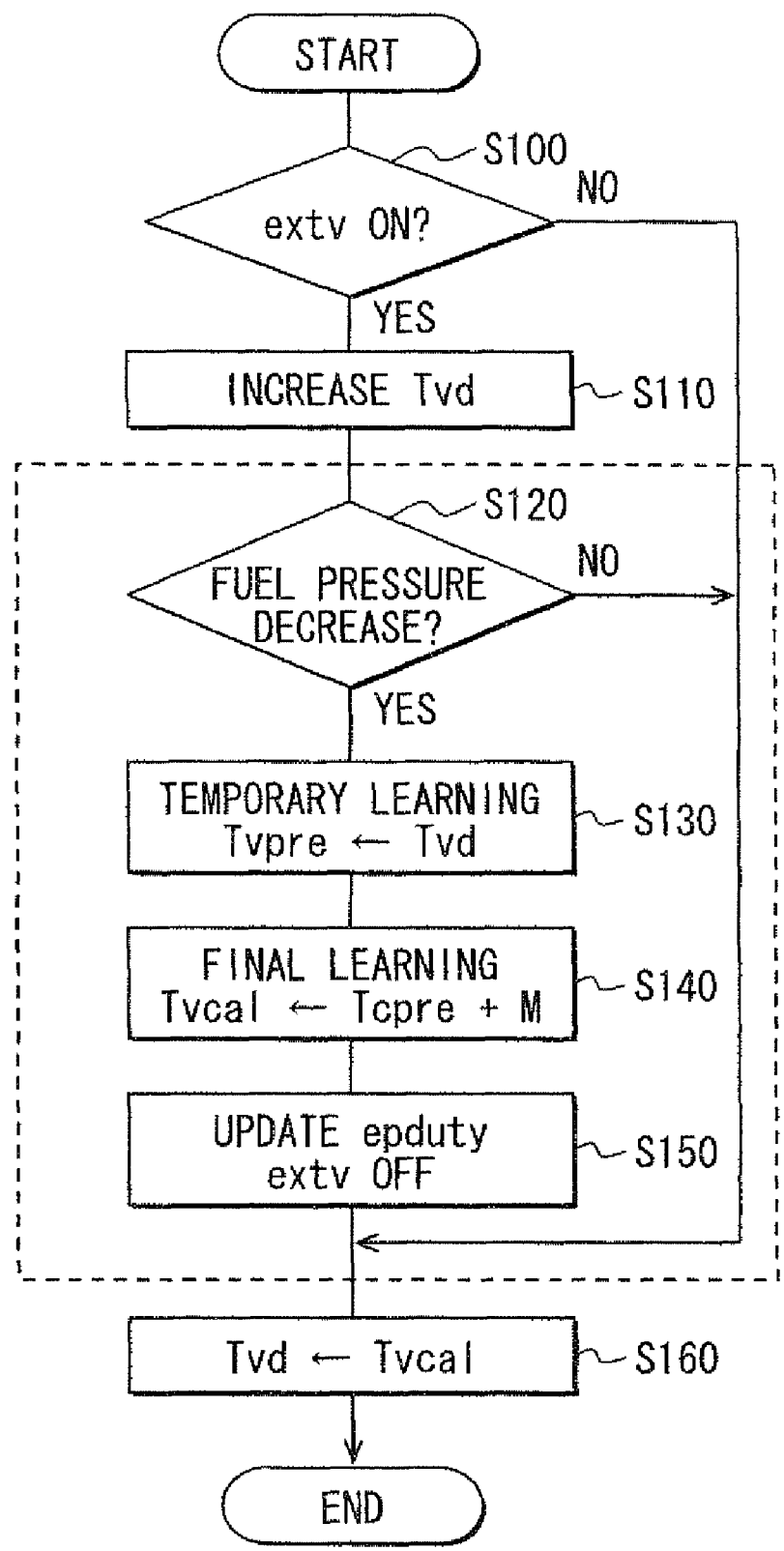
FIG. 8 is a flow chart showing the learning processing according to the first embodiment.

According to the present learning condition determination, the learning processing of S120 to S150, which are indicated by the dashed line in FIG. 8, is performed in each of the first, second, third ranges of the cooling water temperature. Specifically, the learning processing is performed, and the learning value obtained in the learning processing is stored in the case where each of the water temperature condition flags extv1, extv2, extv3 is ON.

According to the present first embodiment, as described above with reference to FIG. 5, only the first driving signal is set at the high level at the time point T1. In the present operation, the electricity starts increasing at the time point T1, and the electricity of the relatively small second driving current I2 is supplied in the time period between the time points T2 and T3. At the time point T3, the needle 64 is close to the closed position, and the second driving signal is set at the high level. Thus, the first driving current I1 is supplied from an intermediate point in the manipulation of the needle 64. In the present operation, electricity of the relatively small second driving current I2 is initially supplied. Thereafter, at the intermediate time point, at which the needle 64 moves by a predetermined distance, electricity of the relatively large first driving current I1 is supplied so as to complete the movement of the needle 64. According to the present operation, increasing in speed of the needle 64, which is shown by the inclination K in FIG. 5, can be restricted. Thus, the soft landing of the needle 64 can be performed. Consequently, impact noise caused between the stationary core 66 and the moving core 68 can be constrained, and thereby operation sound of the needle 64 can be reduced. Furthermore, in the present operation, the electricity supply is finally switched to the relatively large first driving current I1, and thereby the needle 64 can be steadily moved to the closed position even when the time period, in which electricity of the second driving current I2 is supplied, becomes large and the magnetic attractive force becomes insufficient.

Furthermore, according to the present embodiment, the first electricity switch period Tvd is gradually increased at S110 in FIG. 8. In addition, the learning processing is performed at S130, S140, and the first electricity switch period Tvd is set at S160. In the present operation, the first electricity switch period Tvd can be appropriately set, and operation noise caused by the needle 64 can be decreased. In addition, the learning processing is performed at S130, S140 in accordance with the result of the determination whether the fuel pressure is lowered at S120. In the present operation, the upper limit of the first electricity switch period Tvd can be determined, and thereby the first electricity switch period Tvd can be suitably set.

Furthermore, according to the present embodiment, the learning processing is performed when both the following conditions are satisfied that the present operation is determined to be a steady operation at S210 in FIG. 9, and the engine cooling water temperature is greater than or equal to S0 at S220. Thus, the first electricity switch period Tvd can be appropriately set by performing the learning processing on condition of continuation of the steady state. The present condition is defined since a suitable period for electricity supply depends on change in the operation state or the like. Therefore, in the present embodiment, change in the operation state may be determined, and the learning processing may be terminated when the operation state changes in the course of the learning processing.

Furthermore, in the present embodiment, the initial value of the first electricity switch period Tvd is set to zero, and the learning processing is performed by gradually increasing the first electricity switch period Tvd. According to the present operation, the first electricity switch period Tvd can be determined so as to sufficiently maintain an amount of discharged fuel. Furthermore, as described above with reference to FIGS. 12A to 13B, the learning processing is performed in each operation range segment, and thereby the first electricity switch period Tvd can be suitably set in various operation states. Thus, operation noise caused by the needle 64 can be decreased. As described above with reference to FIGS. 12B, 13A, 13B, the learning processing need not be performed in all the operation range segments when the same first electricity switch period Tvd1, Tvd2 is applied to the operation range segments of the higher load and the higher engine rotation speed.

Second Embodiment

Figure 15:
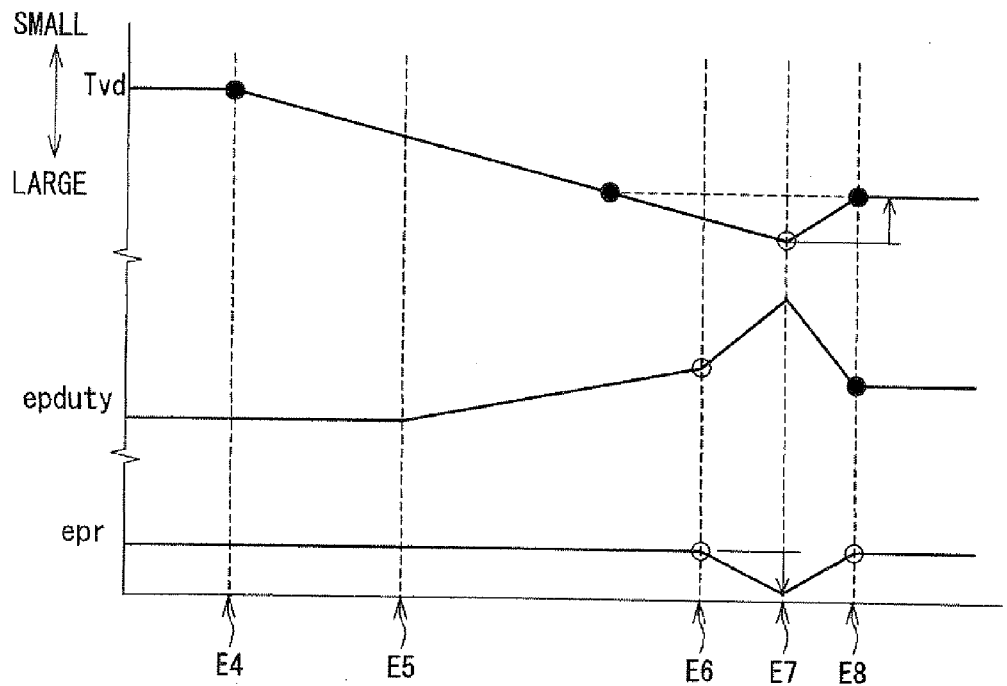
FIG. 15 is a time chart showing an operation of a learning processing according to a second embodiment.

In the present second embodiment, the learning processing is different from that in the first embodiment. As shown in FIG. 15, the first electricity switch period Tvd is gradually increased from the initial value of zero, similarly to the first embodiment. In FIG. 15, the first electricity supply period Tvd decreases in the upward direction and increases in the downward direction. As the first electricity switch period Tvd is increased, a time period, which is subsequent to a time point, at which the first driving signal is set at the high level, and in advance of a time point, at which the second driving signal is set at the high level, is gradually increased. As described above with reference to FIG. 5, as the first electricity switch period Tvd increases, the closing time point of the inlet valve 58 is retarded. In this case, an amount of discharged fuel decreases, and thereby the spill valve closing point epduty begins to increase at the time point E5 in FIG. 15.

In the above first embodiment, the learning processing is performed using the increase Δepduty in the spill valve closing point epduty at E2 in FIG. 7, at which the fuel pressure epr starts decreasing. Contrary, according to the present second embodiment, a temporary learning value Tvpre of the first electricity switch period Tvd is obtained at E7, at which decrease in the fuel pressure reaches a predetermined value, subsequent to start of decrease in the fuel pressure at E6 in FIG. 15. Thus, a final learning value Tvcal is calculated by adding or subtracting a predetermined period to the temporary learning value Tvpre. The present predetermined period is set such that the final learning value Tvcal is within a range of the first electricity switch period Tvd in the time period between E5 and E6 in FIG. 15. The present second embodiment produces an effect, which is similar to the above first embodiment.

Third Embodiment

In the present third embodiment, the learning processing is different from those in the above embodiments. According to the present embodiment, the fuel supply apparatus 100 in FIG. 2 is provided with an oscillation sensor 105 indicated by the dashed line. The oscillation sensor 105 is configured to detect oscillation caused in the high-pressure pump 10. Alternatively, a knock sensor may be provided for detecting engine knock. The fuel-pressure control portion 103 inputs a detection signal from the oscillation sensor 105.

Figure 16:
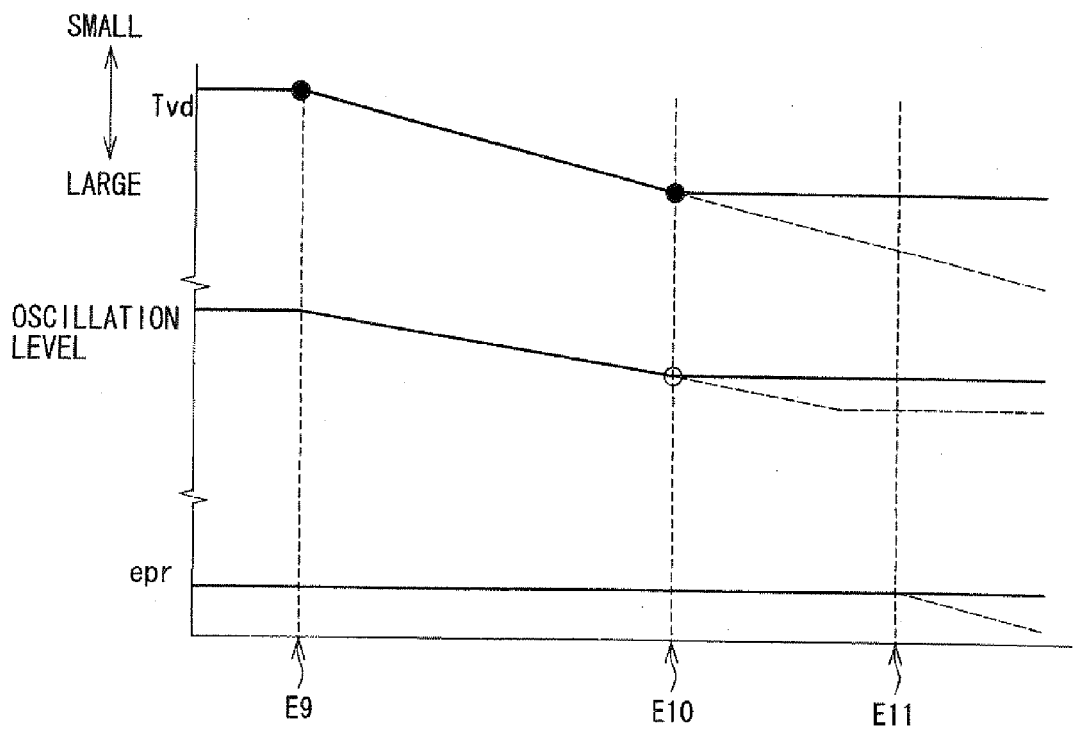
FIG. 16 is a time chart showing an operation of a learning processing according to a third embodiment.

In the present embodiment, as shown in FIG. 16, the first electricity switch period Tvd is gradually increased from the initial value of zero, similarly to the above embodiments. In FIG. 16, the first electricity supply period Tvd decreases in the upward direction and increases in the downward direction. As the first electricity switch period Tvd is increased, a time period between a time point, at which the first driving signal is set at the high level, and a time point, at which the second driving signal is set at the high level, is gradually increased. Referring to FIG. 6, as the first electricity switch period Tvd decreases and reaches Tvd1, the amplitude of oscillation rapidly decreases. Therefore, in the present embodiment, when the oscillation level detected using the oscillation sensor 105 becomes less than a predetermined value, as shown in FIG. 16, the first electricity switch period Tvd at E10 is learned and stored as a learning value. As indicated by the dashed line in FIG. 16, if increase in the first electricity switch period Tvd is continued, the oscillation level is further lowered to a specific level. However, in this case, fuel pressure correspondingly starts decreasing at E11. Therefore, the predetermined value for determining the oscillation level is set so as not to cause decrease in the fuel pressure. The present third embodiment produces an effect, which is similar to the above embodiments.

Fourth Embodiment

As follows, a block configuration of a fuel supply apparatus 1100 including the high-pressure pump 10 will be described with reference to FIG. 17. The fuel supply apparatus 1100 shown in FIG. 17 includes an ECU 1101, which is electrically connected with the terminal 53a of the connector 53 (FIG. 1) so as to control electricity supplied to the coil 65, In the present structure, the ECU 1101 also controls the needle 64 of the metering valve portion 50.

The fuel supply apparatus 1100 includes the ECU 1101 and a fuel-pressure sensor 1102. The ECU 1101 is a microcomputer including a CPU, a ROM, a RAM, and an I/O device and having a bus line connecting thereamong. The ECU 1101 according to the present embodiment includes a fuel-pressure control portion 1103, a drive circuit 1104, and a voltage manipulating portion 1105. The fuel-pressure sensor 1102 detects pressure of fuel discharged from the outlet port 74 (FIG. 1). The fuel-pressure sensor 1102 is provided in a fuel rail portion downstream of the outlet port 74 of the delivery valve portion 70. The fuel-pressure sensor 102 is not limited to be provided in the fuel rail portion and may be provided in any other locations in which the fuel-pressure sensor 102 can detect fuel pressure. The fuel-pressure control portion 1103 receives a detection signal from the fuel-pressure sensor 1102.

The fuel-pressure control portion 1103 outputs a manipulating signal to the drive circuit 1104 based on the detection signal from the fuel-pressure sensor 1102 so as to control the fuel pressure at a target pressure. The fuel-pressure control portion 1103 further outputs a driving signal to the voltage manipulating portion 1105. The voltage manipulating portion 1105 controls a drive voltage of the drive circuit 1104 by manipulating a power supply portion 1200. The drive voltage of the drive circuit 1104 is controlled, and thereby the drive circuit 1104 manipulates electricity supplied to the high-pressure pump 10 based on the controlled drive voltage. For example, the power supply portion 1200 may include a battery and an alternator. The voltage manipulating portion 1105 manipulates the alternator so as to control battery voltage, which is the drive voltage, in the present power supply portion 1200. In case of a hybrid car, the voltage manipulating portion 1105 may control the battery voltage, which is the drive voltage, through a regeneration control when the vehicle decelerates and/or a control of a motor generator (MG). The power supply portion 1200 may output multiple drive voltage signals. In the present structure, the voltage manipulating portion 1105 may switch the multiple drive voltage signals.

Figure 18:
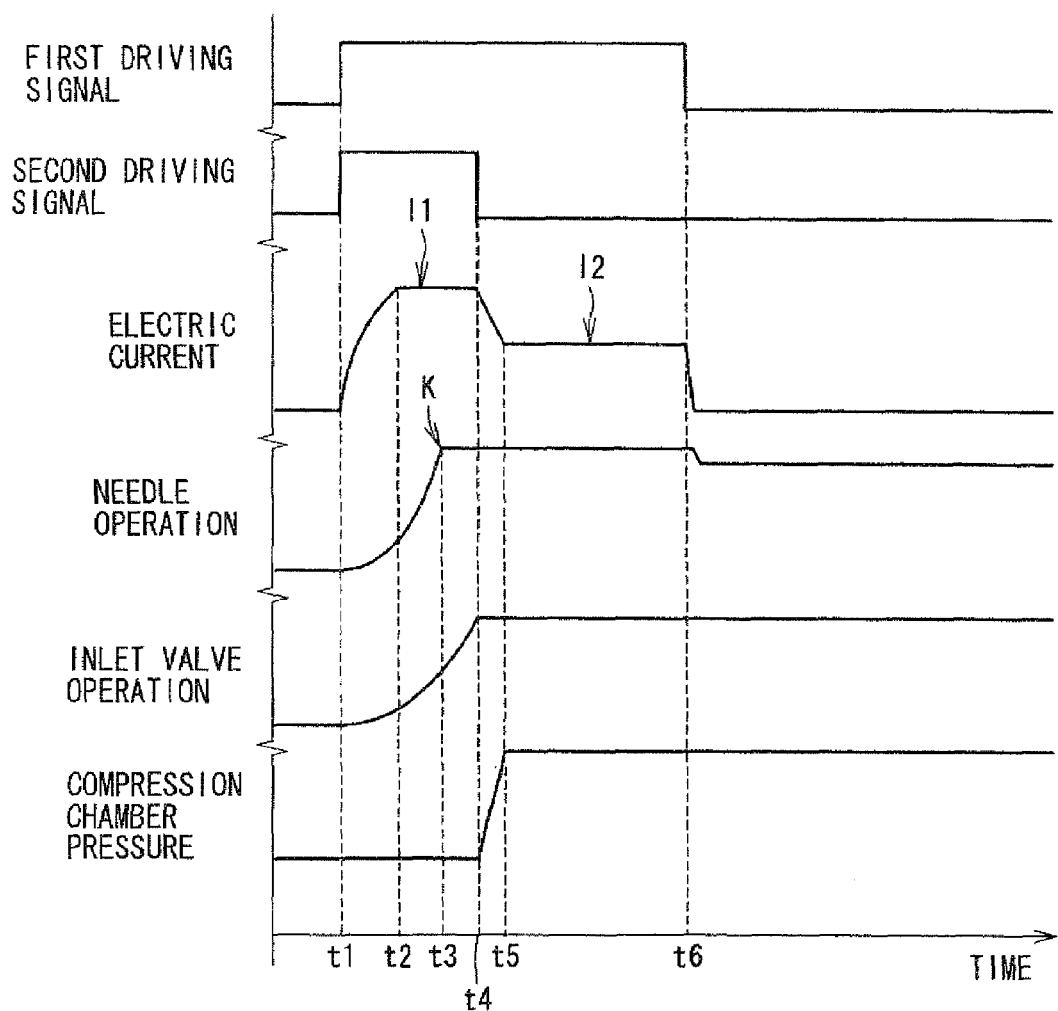
FIG. 18 is a time chart showing an operation of the fuel supply apparatus according to a comparative example.

FIG. 18 is a time chart according to a comparative example. The comparative example shown in FIG. 18 is related to the closing operation of the inlet valve 58 at the time point C in FIG. 3. As indicated by the inlet valve operation in FIG. 18, the inlet valve 58 is closed at the time point t4. As shown by the needle operation in FIG. 18, the needle 64, which is integrated with the moving core 68, moves in advance of the closing operation of the inlet valve 58. Further, as shown by the electric current in FIG. 18, in advance of the movement of the needle 64, electricity is supplied to the moving core 68 so as to cause the magnetic attractive force. Further, as shown by the first driving signal and the second driving signal in FIG. 18, in advance of the electricity supply to the moving core 68, driving signals including the first driving signal and the second driving signal are outputted. In FIG. 18, the driving current starts increasing at the time point t1. In the time period between the time points t2 and t4, relatively large electricity I1 is supplied. Subsequently, in the time period between the time points t5 and t6, relatively small electricity I2 is supplied. At the time point t1, the electricity supply is started so as to cause the magnetic attractive force, and thereby the moving core 68 moves away from the compression chamber 14. Thus, the needle 64 moves integrally with the moving core 68. In FIG. 18, the needle 64 completes the movement at the time point t3. In the present condition, the inlet valve 58 is spaced from the needle 64, and thereafter, as shown by the inlet valve operation in FIG. 18, the inlet valve 58 is closed at the time point t4. Thereby, as shown by the compression chamber pressure in FIG. 18, pressure in the compression chamber 14 starts increasing from the time point t4.

Figure 19:
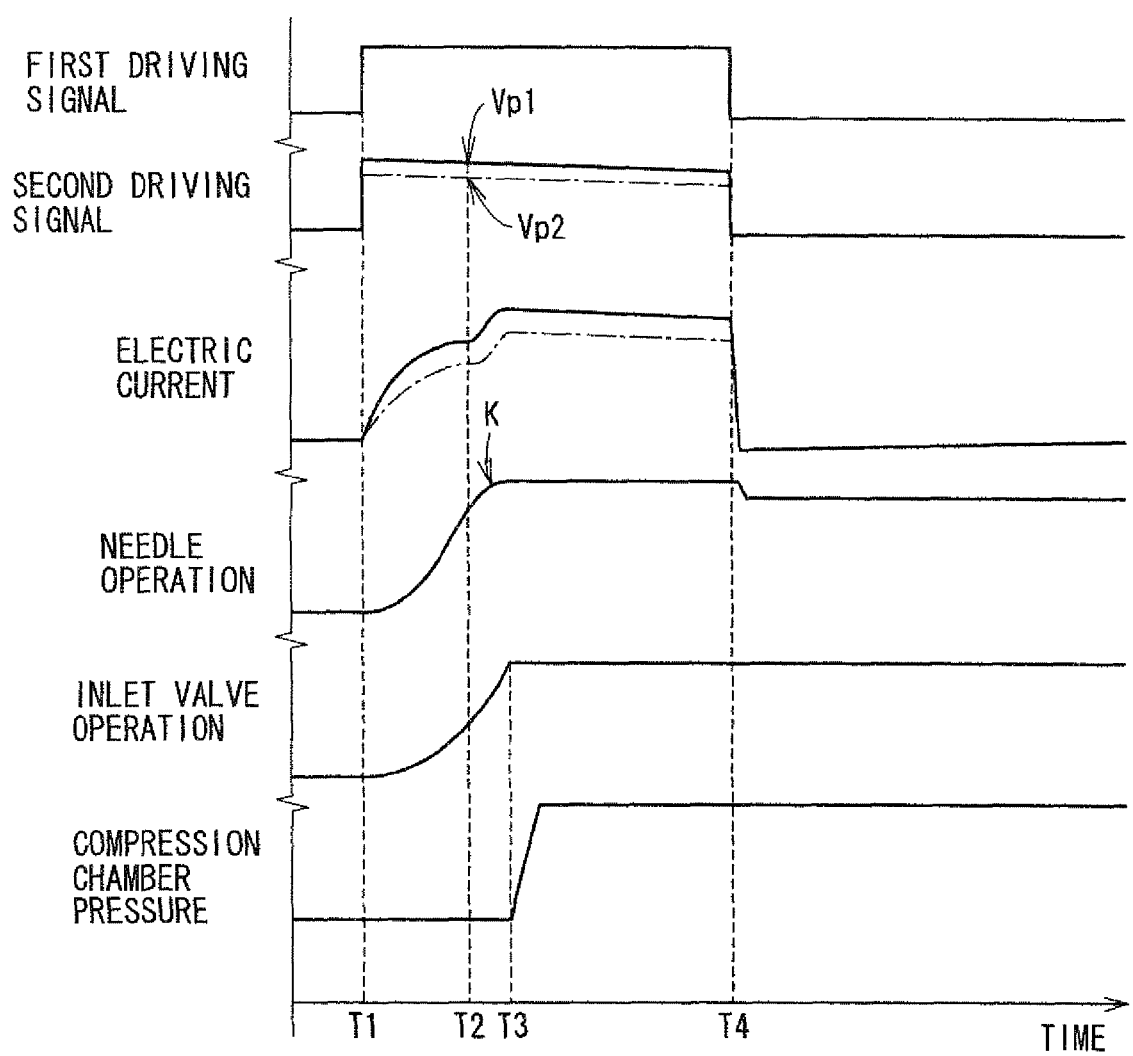
FIG. 19 is a time chart showing an operation of the fuel supply apparatus according to the fourth embodiment.

According to the present comparative example, the second driving signal is set at the low level at the time point t4, at which the inlet valve 58 is closed. Thereafter, the relatively small electricity I2 is supplied in the time period between the time point t5 and the time point t6. The present decrease in the electricity supply is performed, since it suffices that the inlet valve 58 is maintained at the closed state after the inlet valve 58 is once operated at the closed state. However, in the present comparative example, the inlet valve 58 is supplied with electricity of the relatively large driving current I1 at the time point t4, at which the inlet valve 58 is completely in the closed state. Therefore, the motion of the needle 64 indicated by the inclination K of the needle operation at the time point t3 becomes large. In the present condition, the stationary core 66 and the moving core 68 therebetween cause impact noise, for example, and consequently the needle 64 causes large operation sound. Therefore, according to the present fourth embodiment, as described above with reference to FIG. 2, the drive voltage of the drive circuit 1104 controlled. FIG. 19 is a time chart showing an operation of the fuel supply apparatus 1100 according to the present fourth embodiment.

In the comparative example in FIG. 18, the moving core 68 and the needle 64 are supplied with the relatively large driving current I1 and thereby moved from the opened position to the closed position. Contrary, in the present fourth embodiment, the drive voltage starts increasing at the time point T1, and the drive voltage (pre-close drive voltage) immediately before movement of the needle 64 to the closed position is controlled at a predetermined voltage. In FIG. 19, the drive voltage is controlled at Vp1 at the time point T2. According to the present operation, the speed of the needle 64, which is indicated by the inclination K in FIG. 19, can be constrained by appropriately controlling the pre-close drive voltage Vp1. Thus, the soft landing of the needle 64 can be performed. Consequently, impact noise caused between the stationary core 66 and the moving core 68 can be reduced, and thereby operation sound of the needle 64 can be constrained. Thus, operation noise of the movable portion, which includes the moving core 68 and the needle 64, can be constrained. When the pre-close drive voltage is decreased to Vp2 shown in FIG. 19, for example, a completion time point of movement of the needle 64 is retarded compared with a state where the pre-close drive voltage is Vp1. As a result, the closing time point of the inlet valve 58 is retarded. When the closing time point of the inlet valve 58 is retarded, the return stroke of the high-pressure pump 10 is increased. Consequently, the compression stroke becomes short. Therefore, when the pre-close drive voltage is excessively small, the discharge performance of the high-pressure pump 10 may be lowered.

Figure 20:
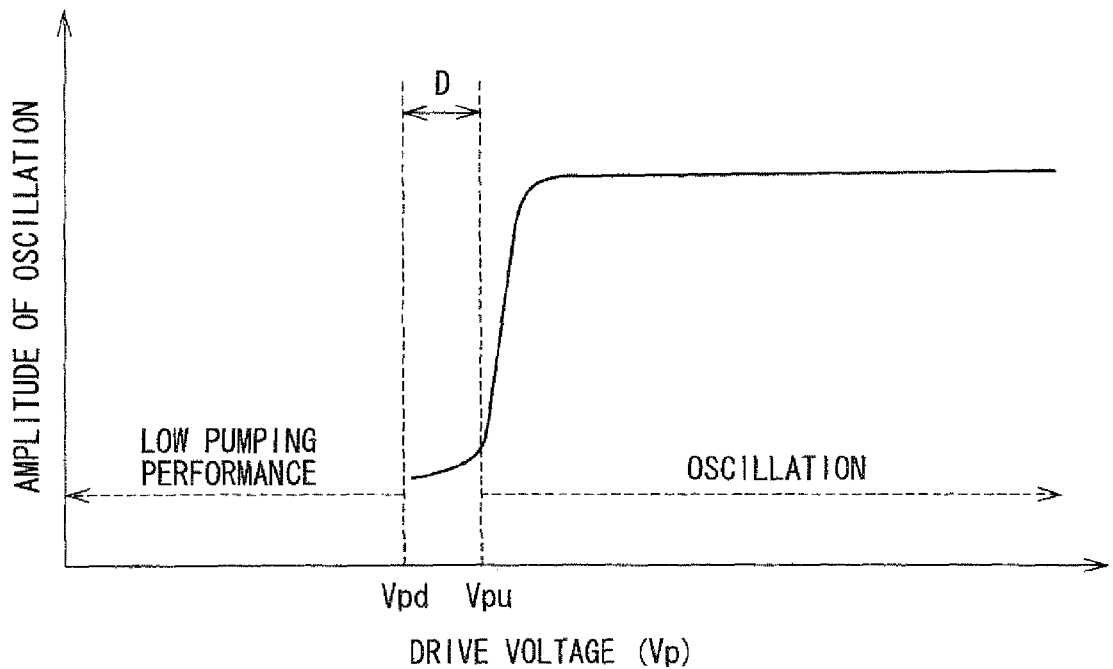
FIG. 20 is a graph showing a drive voltage and the amplitude of oscillation according to the fourth embodiment.

FIG. 20 shows a relationship of the degradation in pumping performance (low pumping performance) and oscillation. According to FIG. 20, when the pre-close drive voltage Vp is greater than Vpu, the amplitude of oscillation rapidly increases, and operation sound becomes large. Alternatively, when the pre-close drive voltage Vp is less than Vpd, the pumping performance is lowered. Therefore, in the present fourth embodiment, a learning processing is performed to set the pre-close drive voltage Vp such that the pre-close drive voltage Vp is set within the range D in FIG. 20.

As follows, the learning processing for setting the pre-close drive voltage Vp will be described. Hereafter, the control of the fuel-pressure control portion 1103 shown in FIG. 17 will be described further in detail. In the ECU 1101, the fuel-pressure control portion 1103 outputs the driving signal to the drive circuit 1104 in accordance with the signal of fuel pressure from the fuel-pressure sensor 1102. The fuel-pressure control portion 1103 sets the driving signal at the high level at the time point T1 in FIG. 19 in order to close the inlet valve 58. The fuel pressure detected by the fuel-pressure sensor 1102 is feedback controlled at a target pressure by manipulating the time point T1 (electricity supply start point). In the present operation, as the fuel pressure detected by the fuel-pressure sensor 1102 decreases, the time point T1 advances in time. Thereby, electricity supply is performed at an earlier time point, and the closing operation of the inlet valve 58 is accelerated (advanced). The driving signal of the fuel-pressure control portion 1103 is set at the high level at the electricity supply start point (spill valve closing point) epduty. The spill valve closing point epduty is set at the top dead center D (FIG. 3) as a reference point. As the closing time point is advanced, the spill valve closing point epduty is increased. Alternatively, as the closing time point is retarded, the spill valve closing point epduty is decreased. The spill valve closing point epduty is equivalent to the electricity supply start point.

Figure 21:
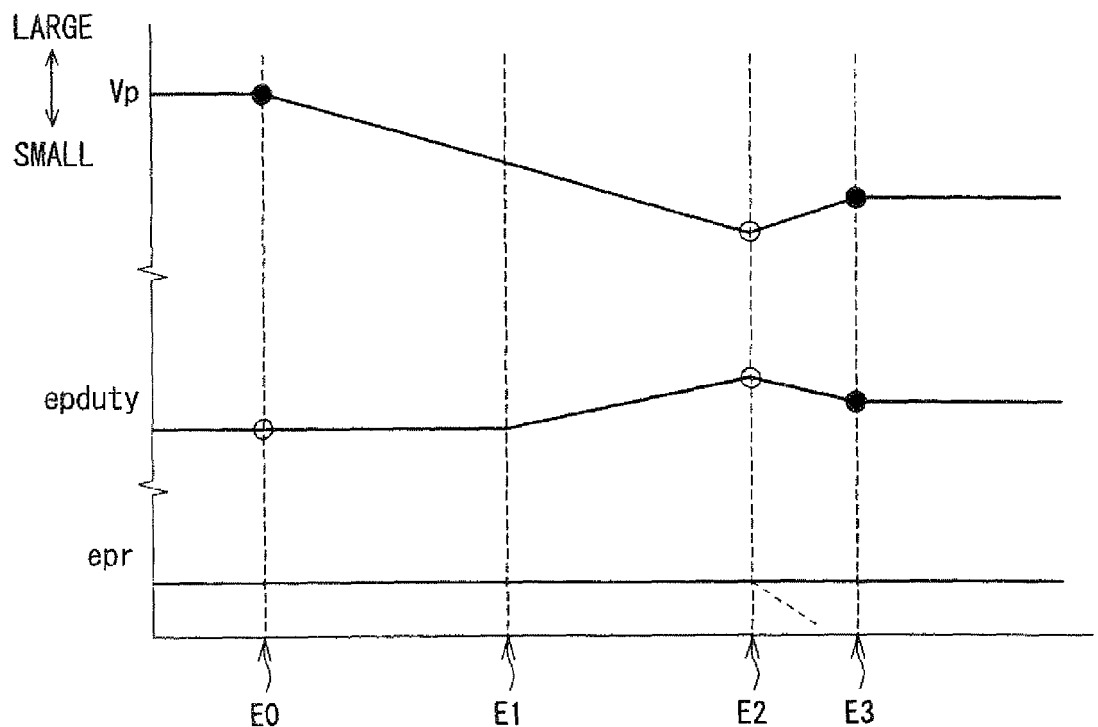
FIG. 21 is a time chart showing a learning processing of the fuel supply apparatus according to the fourth embodiment.

In the present structure, as shown in FIG. 21, the pre-close drive voltage Vp is gradually decreased from a maximum drive voltage in the time period between E0 and E1. Referring to FIG. 19, when the pre-close drive voltage Vp becomes small such that the needle 64 performs the soft landing, the closing time point of the inlet valve 58 is retarded. At this time, the pre-close drive voltage Vp is substantially equivalent to Vpu in FIG. 20. In this case, an amount of fuel discharged from the high-pressure pump 10 decreases, and consequently the fuel pressure detected by the fuel-pressure sensor 1102 decreases. Thus, as shown in FIG. 21, the spill valve closing point epduty increases in the period E1 to E2, and thereby the electricity supply is advanced. The pre-close drive voltage Vp is further decreased, and the fuel pressure cannot be feedback controlled at the target pressure by advancing the electricity supply at a limit E2 in FIG. 21. At this time, the pre-close drive voltage Vp is substantially equivalent to Vpd in FIG. 20. According to the present embodiment, at E2 in FIG. 21, the pre-close drive voltage Vp is temporarily learned and stored. Thereafter, the temporarily learned pre-close drive voltage Vp is added with a return value Vm, and the pre-close drive voltage Vp is further learned (final learning processing). The present return value Vm is, for example, half of an increase (Δepduty) of the spill valve closing point epduty at E2 in FIG. 21. According to the present operation, the pre-close drive voltage Vp is set at a substantially middle point in the range D in FIG. 20.

The learning processing according to the present embodiment will be described further in detail with reference to the flow chart in FIG. 22. At step S600, it is determined whether a learning condition is satisfied. The present processing is performed by determining whether a learning flag extv is ON. The learning flag extv is set to ON when the learning condition is satisfied in the following processings. When the learning flag extv is ON, S600 makes a positive determination. In this case, at subsequent S610, the pre-close drive voltage Vp is decreased. Thus, the processing proceeds to S620. At S610, the pre-close drive voltage Vp is replaced with a value, which is calculated by subtracting a predetermined value from the pre-close drive voltage Vp. When the learning flag extv is OFF, S600 makes a negative determination. In this case, the processing proceeds to S660.

At S620, it is determined whether the fuel pressure begins decreasing. The present processing at S620 corresponds to the determination at E2 in FIG. 21. When it is determined that the fuel pressure begins decreasing, a positive determination is made at S620, and the processing proceeds to S630. Alternatively when the fuel pressure is constantly maintained, a negative determination is made at S620, and the processing proceeds to S660.

At S630, a temporary learning processing is performed. Specifically, in the present processing, a temporary learning value Vpre is replaced with the present pre-close drive voltage Vp. Subsequently, at S640, the temporary learning value Vpre is added with the return value Vm to be a final learning value Vcal.

Subsequently, at S650, the spill valve closing point epduty is updated. Specifically, at S650, the spill valve closing point epduty, which is advanced and changed, is stored, and the learning flag extv is reset to OFF. Thus, the processing proceeds to S660 subsequent to S650. Alternatively, the processing proceeds to S660 when S600 or S620 makes a negative determination. At S660, the pre-close drive voltage Vp is replaced with the learning value Vcal, and thereafter, the present learning processing is terminated.

As follows, a learning condition determination will be described. The present processing is executed for determining whether the learning condition is satisfied. When the learning condition is determined to be satisfied in the present learning condition determination, the learning flag extv is set to ON. First, at S700, it is determined whether the learning flag extv is ON. When the learning flag extv is determined to be ON, a positive determination is made at S700. In this case, the present learning condition determination is terminated without execution of the subsequent processings. When the learning flag extv is determined to be OFF, S700 makes a negative determination. In this case, the present processing proceeds to S710.

At S710, it is determined whether the present operation is a steady operation. The present processing at S710 is performed by determining whether the engine rotation speed NE and the engine load KL are respectively less than predetermined values. In addition to the present determination, it may be determined whether the present operation is in an idle state. Specifically, it may be determined whether the vehicle speed is substantially zero and an accelerator is not manipulated so as to determine the idle state. Instead of the determination of the idle state, it may be determined whether the fuel pressure is less than a predetermined value and/or whether a variable cam timing device (VCT device) is not operated. When it is determined that the present operation is a steady operation, a positive determination is made at S710, and the present processing proceeds to S720. When the present operation is determined not to be a steady operation, a negative determination is made at S710. In this case, the present learning condition determination is terminated without execution of the subsequent processings.

At S720, it is determined whether an engine cooling water temperature is greater than a predetermined value S0. When it is determined that the engine cooling water temperature is greater than or equal to S0, S720 makes a positive determination. In this case, at S730, the learning flag extv is set to ON, and thereafter the learning condition determination is terminated. When the engine cooling water temperature is determined to be less than S0, a negative determination is made at S720. In this case, the present learning condition determination is terminated without execution of the processing at S730.

Figure 23:
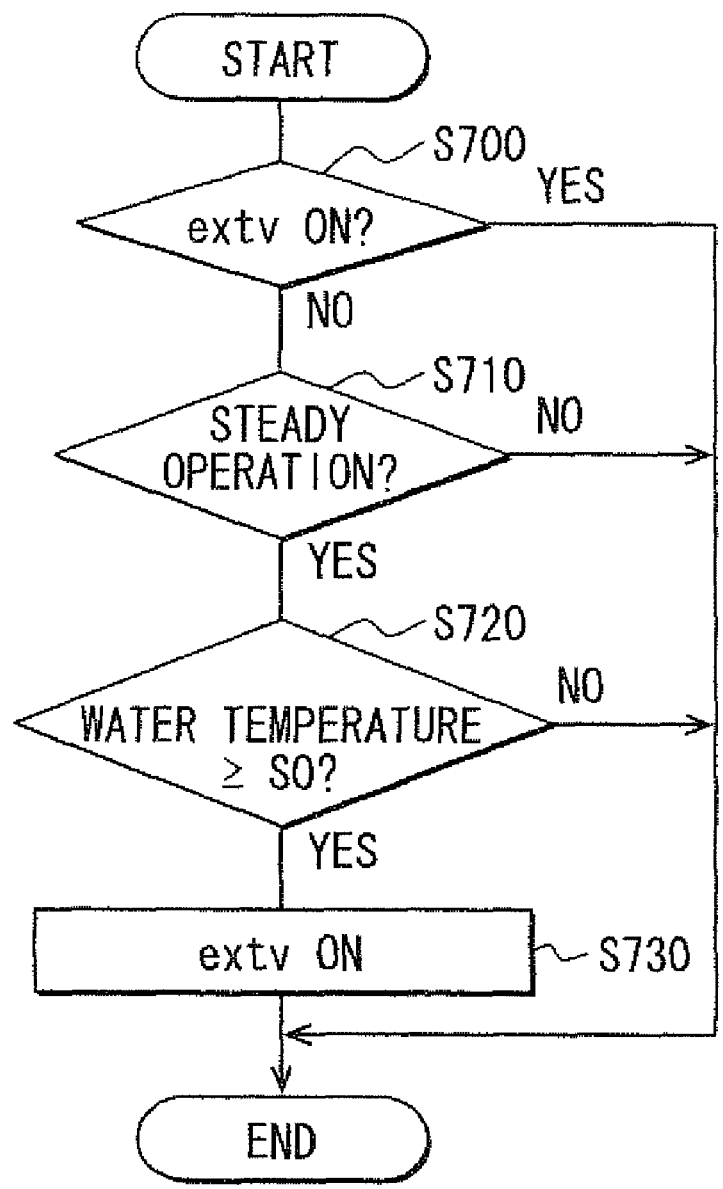
FIG. 23 is a flow chart showing a learning condition determination for the learning processing according to the fourth embodiment.

According to the present embodiment, as determined at S710 in FIG. 23, the learning processing is executed at least in the steady operation. That is, the condition for executing the learning processing includes continuation of the steady state.

(a) Relationship Between Engine Rotation Speed and Learning Condition

In FIG. 10A, as generally known, valve-closing force exerted to the inlet valve 58 becomes large with increase in the pump rotation speed Np. The pump rotation speed Np is the same as rotation speed of the camshaft. As the pump rotation speed Np becomes large, increase in pressure in the compression chamber 14 caused by the plunger 31 is accelerated, and thereby the valve-closing force exerted to the inlet valve 58 is increased. It is noted that the pump rotation speed Np is substantially in proportion to the engine rotation speed NE. Therefore, referring to FIG. 10B, as the engine rotation speed NE becomes high, the pump rotation speed Np increases, and thereby the valve-closing force becomes large. As a result, the amplitude of oscillation becomes large. That is, as the engine rotation speed NE increases, operation noise becomes large. Further, as shown in FIG. 10B, the amplitude of oscillation is relatively small in a range in which the engine rotation speed NE is low. Specifically, as indicated by the portion enclosed with the dashed line in FIG. 10B, oscillation is maintained at the low level in the idling state, and rapid increase in oscillation is not observed immediately after starting of running of the vehicle. As described with reference to FIG. 10A, the valve-closing force becomes high with increase in the pump rotation speed Np, and thereby the closing time point of the inlet valve 58 is advanced. Therefore, the pre-close drive voltage Vp, which is learned in the range where the engine rotation speed NE is low, is preferably used in the state where the engine rotation speed NE is high. In this case, an amount of discharged fuel can be sufficiently maintained. Therefore, the learning processing is desirably performed when the engine rotation speed NE is less than a predetermined value.

(b) Relationship Between Engine Load and Learning Condition

As described above with reference to FIG. 11A, as the engine load becomes high, the cam speed increases. Each of the solid lines in FIG. 11B shows a relationship between an engine load factor and the amplitude of oscillation. One of the solid lines indicates the relationship when the engine rotation speed NE is 650 rpm, and the other indicates the relationship when the engine rotation speed NE is 1000 rpm. When the engine rotation speed NE is 650 rpm, the amplitude of oscillation is substantially constant relative to the engine load factor. When the engine rotation speed NE is 1000 rpm, the amplitude of oscillation becomes slightly high as the engine load factor increases. Therefore, the pre-close drive voltage Vp, which is learned in the range where the engine load is low, is preferably used in the state where the engine load is high. In this case, an amount of discharged fuel can be sufficiently maintained, similarly to the state where the engine rotation speed NE is high. Therefore, the learning processing is desirably performed when the engine load is less than a predetermined value.

Figure 24A:
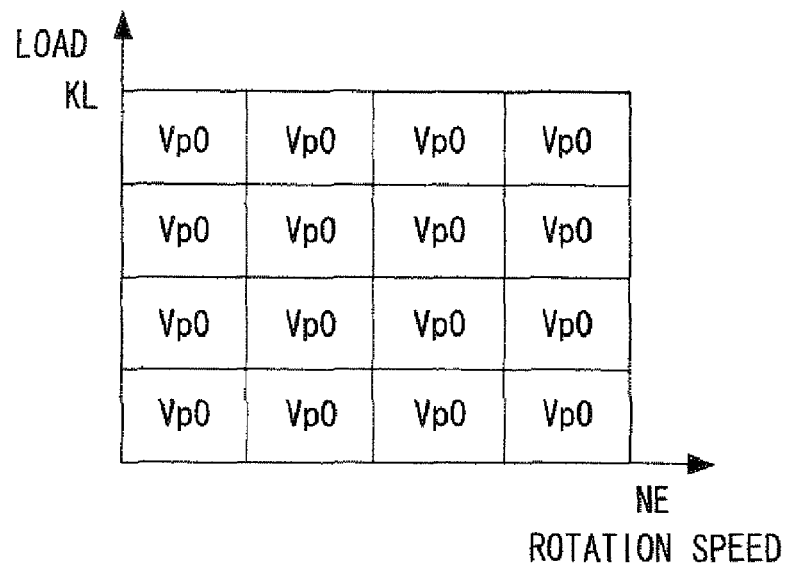
FIGS. 24A, 24B are graphs each showing a data map for the learning processing in each of range segments.

In view of the relationships (a), (b), the learning conditions are desirably satisfied when both the engine rotation speed NE and the engine load are respectively less than the predetermined values. When the learning condition is determined according to the engine rotation speed NE and the engine load KL, the learning condition may be determined to be satisfied in multiple operating ranges, which are defined based on the operation state. For example, as shown in FIG. 24A, four ranges of the engine rotation speed NE and four ranges of the engine load KL may be defined. In this case, sixteen operation range segments are defined, and the learning processing may be performed in each of the operation range segments. According to the present operation, the pre-close drive voltage Vp can be further desirably obtained.

Figure 24B:
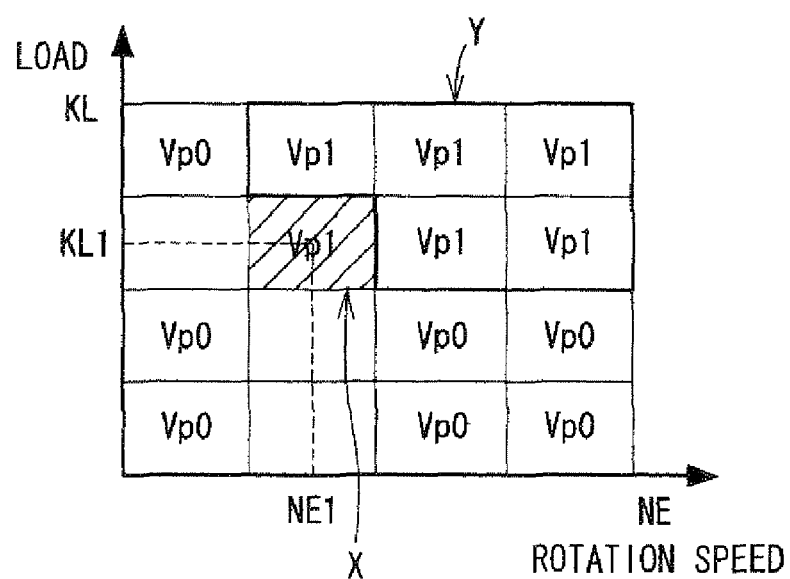

As described above, when the pre-close drive voltage Vp is learned in the state where the engine rotation speed NE is low, and the pre-close drive voltage Vp is used in the state where the engine rotation speed NE is high, an amount of discharged fuel may be sufficiently maintained. In addition, when the pre-close drive voltage Vp is learned in the state where the engine load is low, and the pre-close drive voltage Vp is used in the state where the engine load is high, an amount of discharged fuel may be also sufficiently maintained. Therefore, when the pre-close drive voltage Vp is learned in each of the multiple operation range segments, the learning value, which is obtained in a specific operation range segment, may be used in an operation range segment, which is higher in the higher rotation speed NE and the higher load KL than the specific operation range segment. Specifically, the pre-close drive voltage Vp is learned in an operation range segment X indicated by a hatch pattern in FIG. 24B, in which the engine rotation speed NE is NE1, and the engine load is KL1. In this case, the learning value of the operation range segment X may be used in the five operation range segments Y which are surrounded by the thick solid line and higher than the operation range segment X in the engine rotation speed NE and the engine load KL. In FIG. 24B, the learning value Vp1 is used in both the operation range segments X, Y.

Figure 25A:
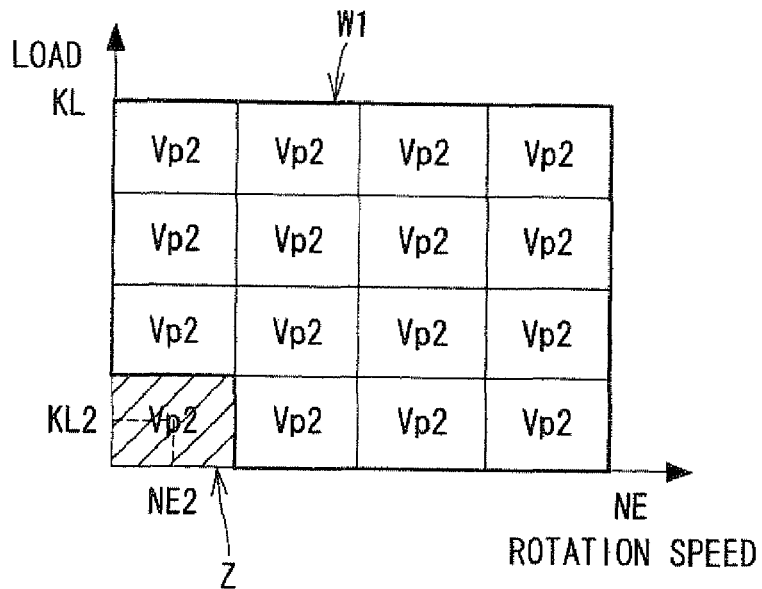
FIGS. 25A, 25B are graphs each showing a data map for the learning processing in each of range segments.
Figure 25B:
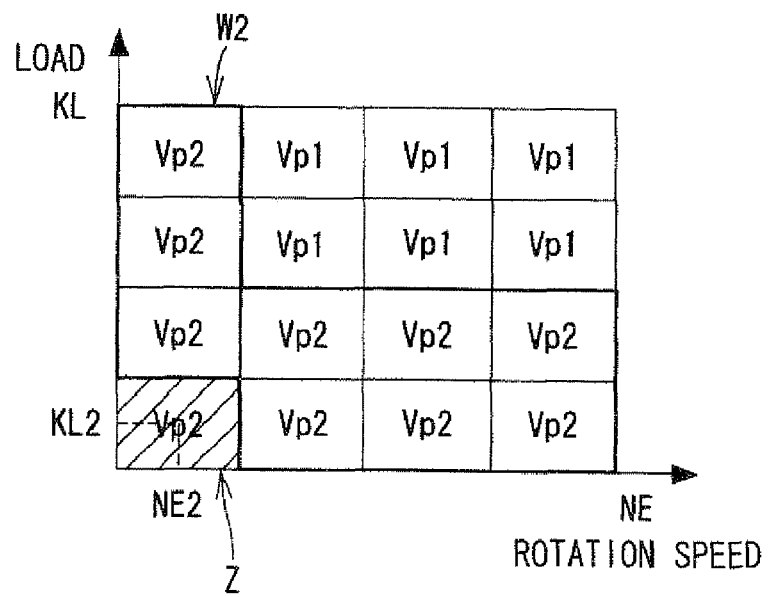

As shown in FIGS. 25A, 25B, the low engine rotation speed NE2 and the low engine load KL2 are learned. The engine rotation speed NE2 and the engine load KL2 are respectively less than the engine rotation speed NE1 and the engine load KL1. The learning value Vp2 obtained in the operation range segment Z is, in general, less than the learning value Vp1. Therefore, as shown in FIG. 25A, the learning value Vp2 may be used in the fifteen operation range segment W1, which is surrounded by the thick solid line and higher in the engine rotation speed NE and the engine load KL than the operation range segment Z. In FIG. 25B, the learning value Vp2 is greater than or equal to the learning value Vp1 in specific operation range segments indicated by Vp1. In this case, the learning value Vp2 may be used in the operation range segment W2, which is higher in the engine rotation speed NE and the engine load KL than the operation range segment Z. The operation range segment W2 is surrounded by the thick solid line and out of the specific operation range segments. As described above, the learning processing is performed in each of the operation range segments, which are defined based on the engine rotation NE speed and the engine load KL. Alternatively, when the learning condition is determined based on the engine cooling water temperature at S720 in FIG. 23, the learning processing may be performed for each of multiple values of the engine cooling water temperature. Specifically, as described below, multiple water temperature ranges may be defined, and the learning processing may be performed in each of the water temperature ranges.

Figure 26:
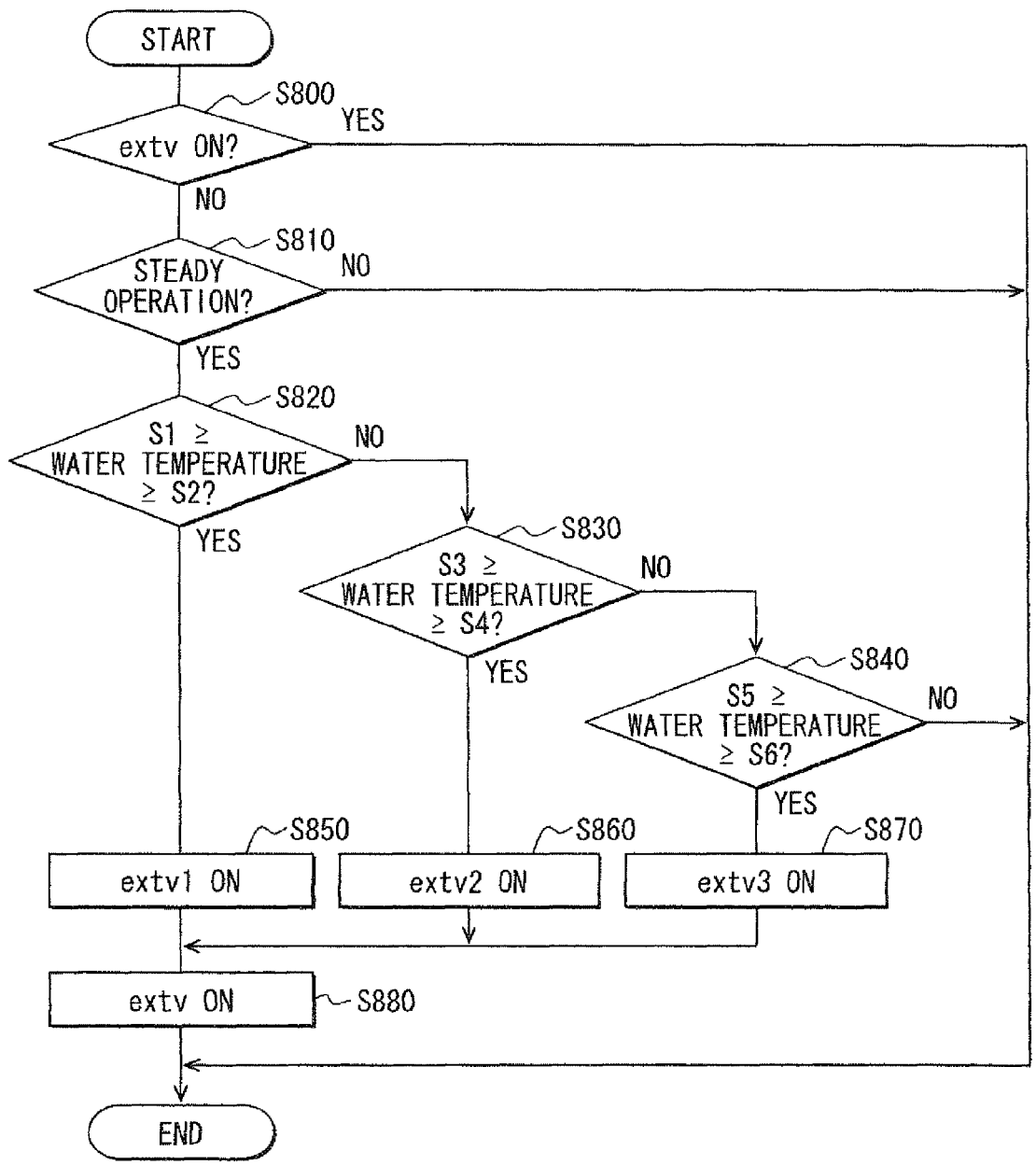
FIG. 26 is a flow chart showing a learning condition determination according to a modification of the fourth embodiment.

FIG. 26 is a flow chart showing a learning condition determination in which a learning condition is determined in each of the engine cooling water temperature ranges. First, at S800, it is determined whether the learning flag extv is ON. The present processing at S800 is similar to the processing at S700 in FIG. 23. When the learning flag extv is determined to be ON, a positive determination is made at S800. In this case, the present learning condition determination is terminated without execution of the subsequent processings. When the learning flag extv is determined to be OFF, S800 makes a negative determination. In this case, the present processing proceeds to S810.

At S810, it is determined whether the present operation is a steady operation. The present processing at S810 is similar to the processing at S710 in FIG. 23. When it is determined that the present operation is a steady operation, a positive determination is made at S810, and the present processing proceeds to S820. When the present operation is determined not to be a steady operation, a negative determination is made at S810. In this case, the present learning condition determination is terminated without execution of the subsequent processings.

At S820, it is determined whether the engine cooling water temperature is in a first range. Specifically, it is determined whether the engine cooling water temperature is grater than or equal to S2 and less than or equal to S1. When it is determined that the engine cooling water temperature is in the first range, S820 makes a positive determination. In this case, at S850, the learning flag extv1 is set to ON, and thereafter the present processing proceeds to S880. When the engine cooling water temperature is determined not to be in the first range, S820 makes a negative determination. In this case, the processing proceeds to S830.

At S830, it is determined whether the engine cooling water temperature is in a second range. Specifically, it is determined whether the engine cooling water temperature is grater than or equal to S4 and less than or equal to S3. When it is determined that the engine cooling water temperature is in the second range, S830 makes a positive determination. In this case, at S860, the learning flag extv2 is set to ON, and thereafter the present processing proceeds to S880. When the engine cooling water temperature is determined not to be in the second range, S830 makes a negative determination. In this case, the processing proceeds to S840.

At S840, it is determined whether the engine cooling water temperature is in a third range. Specifically, it is determined whether the engine cooling water temperature is grater than or equal to S6 and less than or equal to S5. When it is determined that the engine cooling water temperature is in the third range, S840 makes a positive determination. In this case, at S870, the learning flag extv3 is set to ON, and thereafter the present processing proceeds to S880. When the engine cooling water temperature is determined not to be in the third range, S840 makes a negative determination. In this case, the present learning condition determination is terminated.

At S880, which is subsequent to each of S850, S860, S870, the learning flag extv is set to ON, and thereafter the learning condition determination is terminated. The learning flag extv of S880 is set to ON when the learning condition of the water temperature in one of the first to third ranges is satisfied. According to the present learning condition determination, the learning processing of S620 to S650, which are indicated by the dashed line in FIG. 22, is performed in each of the first, second, third ranges of the cooling water temperature. Specifically, the learning processing is performed, and the learning value obtained in the learning processing is stored in the case where each of the water temperature condition flags extv1, extv2, extv3 is ON.

In the present embodiment, as described above with reference to FIG. 19, the drive voltage starts increasing at the time point T1, and the pre-close drive voltage immediately before the needle 64 moves to the closed position is controlled at predetermined voltage. In FIG. 19, the drive voltage is controlled at Vp1 at the time point T2. According to the present operation, the speed of the needle 64, which is indicated by the inclination K in FIG. 19, can be constrained by appropriately controlling the pre-close drive voltage Vp1. Thus, the soft landing of the needle 64 can be performed. Consequently, impact noise caused between the stationary core 66 and the moving core 68 can be reduced, and thereby operation sound of the needle 64 can be constrained.

Figure 22:
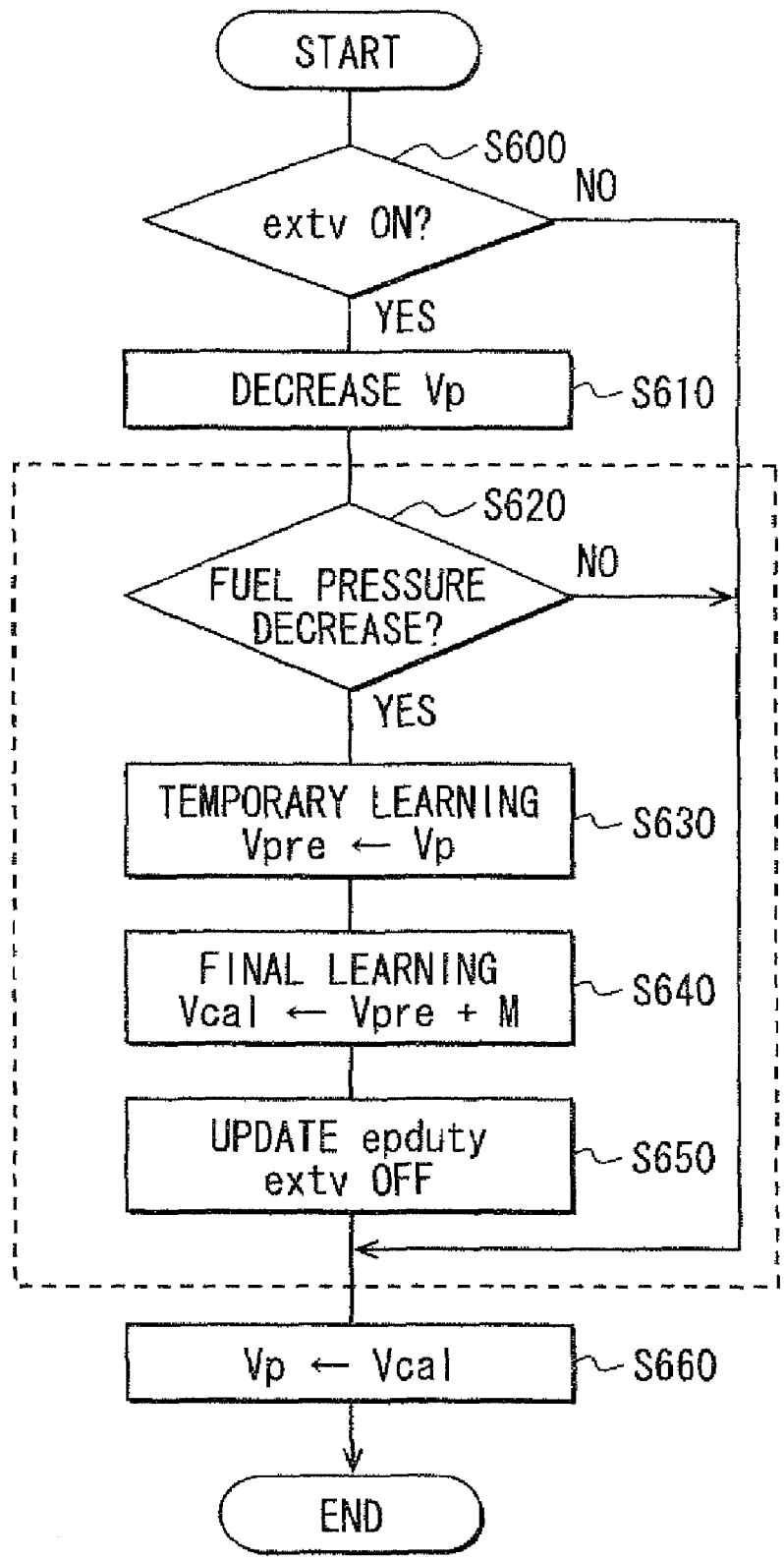
FIG. 22 is a flow chart showing the learning processing according to the fourth embodiment.

Furthermore, according to the present embodiment, the pre-close drive voltage Vp is gradually decreased at S610 in FIG. 22, the learning processing is performed at S630, S640, and the pre-close drive voltage Vp is set at S660. In the present operation, the pre-close drive voltage Vp can be appropriately set, and operation noise caused by the needle 64 can be decreased. In addition, the learning processing is performed at S630, S640 in accordance with the result of the determination whether the fuel pressure is lowered at S620. In the present operation, the lower limit of the pre-close drive voltage Vp can be determined, and thereby the pre-close drive voltage Vp can be suitably set.

Furthermore, according to the present embodiment, the learning processing is performed when both the following conditions are satisfied that the present operation is determined to be a steady operation at S710 in FIG. 23, and the engine cooling water temperature is greater than or equal to S0 at S720. Thus, the pre-close drive voltage Vp can be appropriately set by performing the learning processing on condition of continuation of the steady state. The present condition is defined since a suitable period for electricity supply depends on change in the operation state or the like. Therefore, in the present embodiment, change in the operation state may be determined, and the learning processing may be terminated when the operation state changes in the course of the learning processing.

Furthermore, in the present embodiment, the initial value of the pre-close drive voltage Vp is set to the maximum drive voltage, and the learning processing is performed by gradually decreasing the pre-close drive voltage Vp. According to the present operation, the pre-close drive voltage Vp can be determined so as to sufficiently maintain an amount of discharged fuel.

Furthermore, as described above with reference to FIGS. 24, 25, the learning processing is performed in each operation range segment, and thereby the pre-close drive voltage Vp can be suitably set in various operation states. Thus, the operation noise caused by the needle 64 can be decreased. As described above with reference to FIGS. 24B, 25A, 25B, the learning processing need not be performed in all the operation range segments when the same pre-close drive voltage Vp1, Vp2 is applied to the operation range segments of the higher load and the higher engine rotation speed.

Fifth Embodiment

Figure 27:
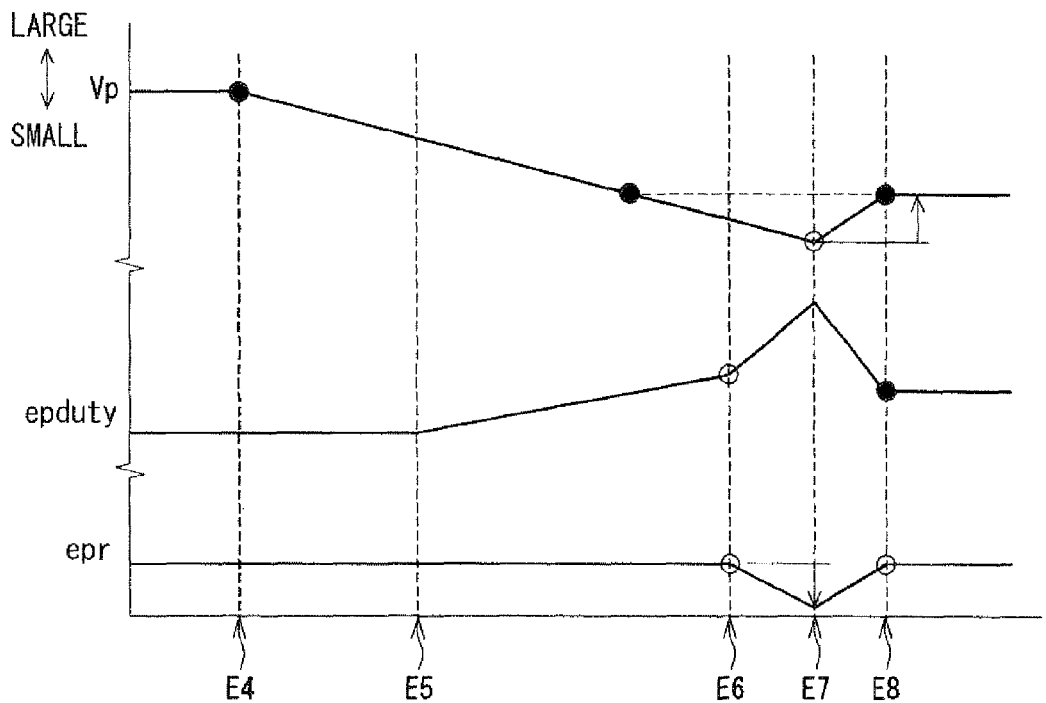
FIG. 27 is a time chart showing a learning processing according to a fifth embodiment.

In the present fifth embodiment, the learning processing is different from that in the fourth embodiment. As shown in FIG. 27, the pre-close drive voltage Vp is gradually decreased from the initial maximum value, similarly to the fourth embodiment. As described above with reference to FIG. 19, as the pre-close drive voltage Vp decreases, the closing time point of the inlet valve 58 is retarded. In this case, an amount of discharged fuel decreases, and thereby the spill valve closing point epduty begins to increase at the time point E5 in FIG. 27. In the above fourth embodiment, the learning processing is performed using the increase Δepduty in the spill valve closing point epduty at E2 in FIG. 21, at which the fuel pressure epr starts decreasing. Contrary, according to the present fifth embodiment, a temporary learning value Vpre of the pre-close drive voltage Vp is obtained at E7, at which decrease in the fuel pressure reaches a predetermined value, subsequent to start of decrease in the fuel pressure at E6 in FIG. 27. Thus, a final learning value Vcal is calculated by adding a predetermined voltage to the pre-close drive voltage Vp. The present predetermined voltage is set such that the final learning value Vcal is within a range of the pre-close drive voltage Vp in the time period between E5 and E6 in FIG. 27. The present fifth embodiment produces an effect, which is similar to the above embodiments.

Sixth Embodiment

In the present sixth embodiment, the learning processing is different from those in the fourth and fifth embodiments.

Figure 17:
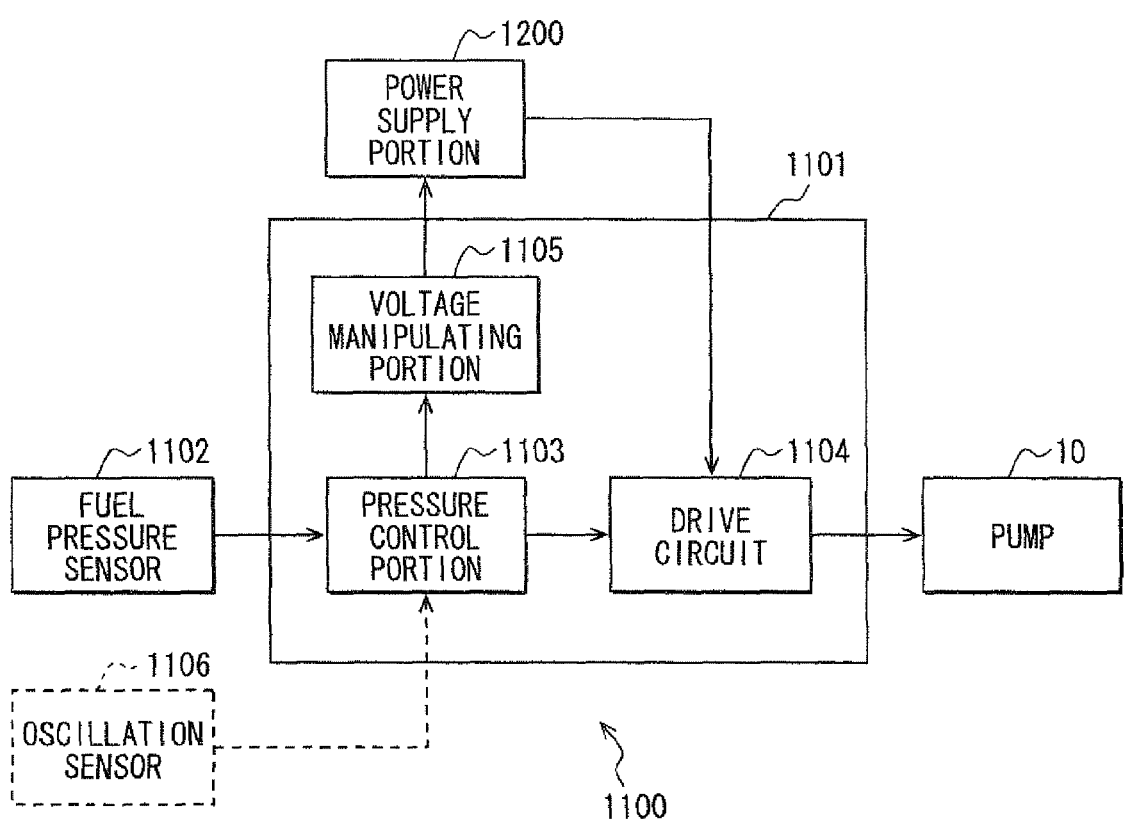
FIG. 17 is a block diagram showing a fuel supply apparatus according to a fourth embodiment.
Figure 28:
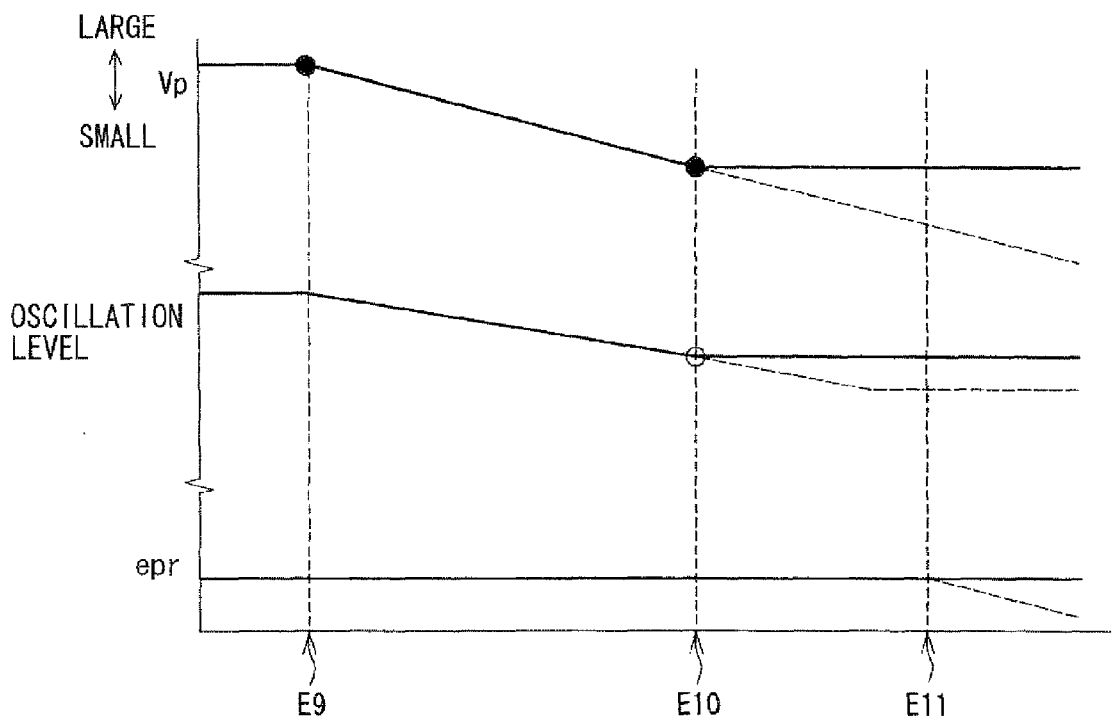
FIG. 28 is a time chart showing a learning processing according to a sixth embodiment.

According to the present embodiment the fuel supply apparatus 1100 in FIG. 17 is provided with an oscillation sensor 1106 indicated by the dashed line. The oscillation sensor 1106 is configured to detect oscillation caused in the high-pressure pump 10. Alternatively, a knock sensor may be provided for detecting engine knock. The fuel-pressure control portion 1103 inputs a detection signal from the oscillation sensor 1106. In the present embodiment, as shown in FIG. 28, the pre-close drive voltage Vp is gradually decreased from the initial maximum value, similarly to the fourth embodiment. Referring to FIG. 20, as the pre-close drive voltage Vp decreases and reaches Vpu, the amplitude of oscillation rapidly decreases. Therefore, in the present embodiment, when the oscillation level detected using the oscillation sensor 1106 becomes less than a predetermined value, as shown in FIG. 28, the pre-close drive voltage Vp at E10 is stored as a learning value. As indicated by the dashed line in FIG. 28, if decrease in the pre-close drive voltage Vp is continued, the oscillation level is further lowered to a specific level. However, in this case, fuel pressure correspondingly starts decreasing at E11. Therefore, the predetermined value for determining the oscillation level is set not to cause decrease in fuel pressure. The present sixth embodiment produces an effect, which is similar to the above embodiments.

In the first to sixth embodiments, the fuel chamber 13 functions as a fuel portion, the inlet valve 58 functions as a valve element, the needle 64 and the moving core 68 function as a movable portion, the delivery valve portion 70 functions as a delivery portion, the fuel-pressure sensor 1102 functions as fuel-pressure detection means, the fuel-pressure control portion 103, 1103 functions as drive control means, the drive circuit 104, 1104 functions as a drive circuit portion, the voltage manipulating portion 1105 functions as voltage control means, and each of the oscillation sensors 105, 1106 functions as vibration detecting means.

Other Embodiments

According to the first embodiment, as described above with reference to FIG. 8, it is determined whether fuel pressure decreases at S120. Thereafter, the final learning processing is performed using the increase Δepduty in the spill valve closing point epduty at S140. Alternatively, the temporary and the final learning processings may be performed based on only the increase in the spill valve closing point epduty. Specifically, the temporary learning processing is performed to obtain a temporary learning value when the increase Δepduty becomes greater than a predetermined value, and, for example, a return value may be added to the temporary learning value. The present return value is equivalent to a value of Δepduty/2, which is a half value of the increase Δepduty. According to the present learning processing, which is performed based on the spill valve closing point epduty, the temporary learning processing may be omitted similarly to the third embodiment, and the learning processing may be performed when the Δepduty increases by a predetermined value.

According to the fourth embodiment, as described above with reference to FIG. 22, it is determined whether fuel pressure decreases at S620. Thereafter, the final learning processing is performed using the increase Δepduty in the spill valve closing point epduty at S640. Alternatively, the temporary and the final learning processings may be performed based on only the increase in the spill valve closing point epduty. Specifically, the temporary learning processing is performed to obtain a temporary learning value when the increase Δepduty becomes greater than a predetermined value, and, for example, a return value may be added to the temporary learning value. The present return value is equivalent to a value of Δepduty/2, which is a half value of the increase Δepduty. According to the present learning processing, which is performed based on the spill valve closing point epduty, the temporary learning processing may be omitted similarly to the sixth embodiment, and the learning processing may be performed when the Δepduty increases by a predetermined value.

In the above embodiments, the multiple operating ranges, which are defined based on the operation states such as the engine rotation speed, the engine load, and the engine cooling water temperature. In addition to the operation states, the multiple operating ranges may be defined based on temperature of engine oil.

The continuation of the steady state may be determined based on the above operation states. In addition, the present continuation may be determined by determining whether at least one of the battery voltage, the fuel temperature, the fuel pressure, and the fuel viscosity is in a predetermined range.

Furthermore, it is conceived that a fuel-pressure condition may be employed as a learning condition. For example, in the learning processing according to the second and fifth embodiments, it is determined whether the fuel pressure decreases by a predetermined quantity. However, the present leaning processing may cause insufficient combustion. Therefore, the learning processing may be performed by determining whether the fuel pressure is high. In addition, in the first, third, fourth, and sixth embodiments, the learning processing may be performed by determining whether the fuel pressure is high.

When the learning processing is performed to obtain the first electricity switch period in the condition where the fuel pressure is low, the obtained first electricity switch period can also be used in the condition where the fuel pressure is high. Alternatively, when the learning processing is performed to obtain the pre-close drive voltage in the condition where the fuel pressure is low, the obtained pre-close drive voltage can also be used in the condition where the fuel pressure is high. Therefore, in the first, third, fourth, and sixth embodiments, the learning processing may be performed by determining whether the fuel pressure is low as a learning condition.

The above structures of the embodiments can be combined as appropriate. Specifically, the first embodiment may be combined with the fourth embodiment to control the first electricity switch period Tvd and the pre-close drive voltage Vp simultaneously.

The above processings such as calculations and determinations are not limited being executed by the ECU 101, 1101. The control unit may have various structures including the ECU 101, 1101 shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A fuel supply apparatus for a vehicle, the fuel supply apparatus comprising:
    a fuel portion for receiving fuel;
    a valve element located in a fuel passage, which communicates with the fuel portion;
    a delivery portion for supplying fuel pressurized in a compression chamber, which is located downstream of the fuel passage;
    a movable portion movable between a closed position and an opened position and configured to make contact with the valve element;
    a coil portion for applying magnetic attractive force to the movable portion;
    a drive circuit portion configured to manipulate the movable portion from the opened position to the closed position by supplying a first driving current to the coil portion; the drive circuit portion being configured to maintain the movable portion at the closed position by supplying a second driving current, which is less than the first driving current, to the coil portion;
    drive control means for controlling the drive circuit portion by switching supply of the second driving current to supply of the first driving current to move the movable portion to the closed position in the course of movement of the movable portion to the closed position by supplying the second driving current; and
    fuel-pressure detection means for detecting pressure of fuel supplied from the delivery portion,
    wherein the drive control means is configured to determine a start point, at which supply of the second driving current is started, based on the pressure of fuel, and
    wherein the drive control means is configured to perform a learning processing to gradually increase a switch period, which is from the start point to a switch point at which supply of the second driving current is switched to supply of the first driving current.

2. The fuel supply apparatus according to claim 1, wherein the drive control means is configured to perform the learning processing and set the switch period based on change in the start point.

3. The fuel supply apparatus according to claim 1, wherein the drive control means is configured to perform the learning processing and set the switch period based on change in the pressure of fuel.

4. The fuel supply apparatus according to claim 1, further comprising:
    oscillation detecting means for detecting oscillation,
    wherein the drive control means is configured to perform the learning processing and set the switch period based on change in the oscillation.

5. The fuel supply apparatus according to claim 1, wherein the drive control means is configured to perform the learning processing and set the switch period in each of a plurality of operation range segments, which are defined based on an operation state of the vehicle.

6. The fuel supply apparatus according to claim 5,
    wherein the plurality of operation range segments includes a first segment and a second segment,
    the drive control means is configured to perform the learning processing and set the switch period in the first segment, and
    the drive control means is configured to apply the switch period, which is set in the first segment, to the second segment, in which the switch period is estimated to be greater than the switch period in the first segment, without the learning processing.

7. The fuel supply apparatus according to claim 1, wherein the drive control means performs the learning processing on condition of continuation of a steady state in which an operation state of the vehicle is steadily maintained.

8. The fuel supply apparatus according to claim 1, wherein the drive control means terminates the learning processing when an operation state of the vehicle is out of the steady state in the course of the learning processing.

9. The fuel supply apparatus according to claim 1, wherein the drive control means is configured to set the switch period at zero as an initial value in advance of performing the learning processing.

10. A fuel supply apparatus for a vehicle, the fuel supply apparatus comprising:
a fuel portion for receiving fuel;
a valve element located in a fuel passage, which communicates with the fuel portion;
a delivery portion for supplying fuel pressurized in a compression chamber, which is located downstream of the fuel passage;
a movable portion movable between a closed position and an opened position and configured to make contact with the valve element;
a coil portion for applying magnetic attractive force to the movable portion;
a drive circuit portion configured to supply an electric current to the coil portion at a drive voltage;
drive control means for controlling a start point at which the drive circuit portion supplies the electric current;
voltage control means for setting a pre-close drive voltage at a position close to the closed position when the movable portion is moved to the closed position, based on the start point and controlling the drive voltage at the pre-close drive voltage; and
fuel-pressure detection means for detecting pressure of fuel supplied from the delivery portion,
wherein the drive control means is configured to determine the start point based on the pressure of fuel, and
wherein the voltage control means is configured to perform a learning processing to gradually decrease the pre-close drive voltage.

11. The fuel supply apparatus according to claim 10, wherein the voltage control means is configured to perform the learning processing and set the pre-close drive voltage based on change in the start point.

12. The fuel supply apparatus according to claim 10, wherein the voltage control means is configured to perform the learning processing and set the pre-close drive voltage based on change in the pressure of fuel.

13. The fuel supply apparatus according to claim 10, further comprising:
oscillation detecting means for detecting oscillation,
wherein the voltage control means is configured to perform the learning processing and set the pre-close drive voltage based on change in the oscillation.

14. The fuel supply apparatus according to claim 10, wherein the voltage control means is configured to perform the learning processing and set the pre-close drive voltage in each of a plurality of operation range segments, which are defined based on an operation state of the vehicle.

15. The fuel supply apparatus according to claim 14, wherein the plurality of operation range segments includes a first segment and a second segment,
the voltage control means is configured to perform the learning processing and set the pre-close drive voltage in the first segment, and
the voltage control means is configured to apply the pre-close drive voltage, which is set in the first segment, to the second segment, in which the pre-close drive voltage is estimated to be greater than the pre-close drive voltage in the first segment, without the learning processing.

16. The fuel supply apparatus according to claim 10, wherein the voltage control means performs the learning processing on condition of continuation of a steady state in which an operation state of the vehicle is steadily maintained.

17. The fuel supply apparatus according to claim 10, wherein the voltage control means terminates the learning processing when an operation state of the vehicle is out of the steady state in the course of the learning processing.

18. The fuel supply apparatus according to claim 10, wherein the voltage control means is configured to set a maximum drive voltage as an initial value in advance of performing the learning processing.

19. A method for controlling a fuel supply apparatus for a vehicle, the method comprising:
supplying a small driving current to a coil portion so as to apply magnetic force to attract a movable portion and thereby to manipulate a valve element from an opened position, in which the movable portion is in contact with the valve element to supply fuel into a compression chamber, to a closed position, in which the valve element is seated to a seat body, the small driving current being sufficient to maintain the movable portion at the closed position;
switching supply of the small driving current to supply of a large driving current, which is larger than the small driving current in the course of movement of the movable portion to the closed position by the supplying of the small driving current;
detecting pressure of fuel supplied from the delivery portion;
determining a start point, at which supply of the second driving current is started, based on the pressure of fuel; and
performing a learning processing to gradually increase a switch period, which is from the start point to a switch point at which supply of the second driving current is switched to supply of the first driving current.

20. A method for controlling a fuel supply apparatus for a vehicle, the method comprising:
supplying an electric current to a coil portion so as to apply magnetic force to attract a movable portion and thereby to manipulate a valve element from an opened position, in which the movable portion is in contact with the valve element to supply fuel into a compression chamber, to a closed position, in which the valve element is seated to a seat body, at a drive voltage;
controlling a start point of the supplying of the electric current;
setting a pre-close drive voltage at a position close to the closed position when the movable portion is moved to the closed position, based on the start point;
controlling the drive voltage at a pre-close drive voltage;
detecting pressure of fuel supplied from the delivery portion;
determining the start point based on the pressure of fuel; and
performing a learning processing to gradually decrease the pre-close drive voltage.

* * * * *